(12) United States Patent
Fuller et al.

(10) Patent No.: US 9,231,504 B2
(45) Date of Patent: Jan. 5, 2016

(54) ELECTRICAL CONTROL SYSTEM

(71) Applicants: Robert Lyle Fuller, Conifer, CO (US); David J. Wehrlen, Evergreen, CO (US)

(72) Inventors: Robert Lyle Fuller, Conifer, CO (US); David J. Wehrlen, Evergreen, CO (US)

( * ) Notice: Subject to any disclaimer, the term of this patent is extended or adjusted under 35 U.S.C. 154(b) by 349 days.

(21) Appl. No.: 13/895,336

(22) Filed: May 15, 2013

(65) Prior Publication Data
US 2013/0307450 A1 Nov. 21, 2013

Related U.S. Application Data

(60) Provisional application No. 61/647,230, filed on May 15, 2012.

(51) Int. Cl.
| | |
|---|---|
| *H02P 6/10* | (2006.01) |
| *B60L 3/00* | (2006.01) |
| *B60L 15/04* | (2006.01) |
| *B60L 15/08* | (2006.01) |
| *B60L 15/20* | (2006.01) |
| *H02M 3/158* | (2006.01) |
| *H02M 1/12* | (2006.01) |
| *H02P 6/08* | (2006.01) |
| *H02M 1/00* | (2007.01) |

(52) U.S. Cl.
CPC .......... *H02P 6/10* (2013.01); *B60L 3/0061* (2013.01); *B60L 15/04* (2013.01); *B60L 15/08* (2013.01); *B60L 15/20* (2013.01); *B60L 2210/14* (2013.01); *B60L 2210/40* (2013.01); *B60L 2220/14* (2013.01); *B60L 2220/16* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/527* (2013.01); *B60L 2240/529* (2013.01); *H02M 1/12* (2013.01); *H02M 3/158* (2013.01); *H02M 2001/007* (2013.01); *H02M 2001/0048* (2013.01); *H02P 6/085* (2013.01); *Y02B 70/1491* (2013.01)

(58) Field of Classification Search
USPC .................. 318/400.3, 459, 478, 479, 504
See application file for complete search history.

(56) References Cited

U.S. PATENT DOCUMENTS

| | | | | |
|---|---|---|---|---|
| 5,329,195 | A | * | 7/1994 | Horber et al. ............... 310/68 B |
| 5,345,156 | A | | 9/1994 | Moreira |
| 6,397,611 | B1 | * | 6/2002 | Yamato et al. ................. 62/180 |

(Continued)

OTHER PUBLICATIONS

Isao Takahashi, Takehisa Koganezawa, Guijia Su, and Kazunobu Oyama, A Super High Speed PM Motor Drive System by a Quasi-Current Source Inverter, IEEE Symposium, 1993, pp. 657, 658, 659, 660,661, and 662.

*Primary Examiner* — Bentsu Ro
(74) *Attorney, Agent, or Firm* — Roger A. Jackson

(57) ABSTRACT

An electrical control system having a direct current to direct current regulator receiving a direct current supply input, wherein the regulator outputs a controlled voltage direct current inverter power feed. Included is an inverter in electrical communication with the regulator and receives the controlled voltage direct current inverter power feed, the inverter outputs an alternating current motor power feed to a permanent magnet brushless direct current motor that outputs a shaft rotational speed and a back electromotive force. Also, a control is provided for regulating the controlled voltage direct current inverter power feed based upon criteria utilizing the back electromotive force or an auxiliary motor stator wire loop signal in conjunction with an optional voltage look-up table to substantially make the controlled voltage result in a reduction of a pulse width modulation switching frequency to further smooth and reduce harmonic of the alternating current waveform to increase motor efficiency.

6 Claims, 31 Drawing Sheets

(56) References Cited

U.S. PATENT DOCUMENTS

| | | |
|---|---|---|
| 6,424,798 B1 | 7/2002 | Kitamine |
| 7,230,361 B2 | 6/2007 | Hirzel |
| 7,917,017 B2 * | 3/2011 | Kanamori .................. 388/811 |
| 8,080,960 B2 | 12/2011 | Rozman |
| 8,138,694 B2 | 3/2012 | Steigerwald |

* cited by examiner

750 Hz PMDC Sin Wound Motor
~15 kW Maximum Power at 100,000 rpm
Test at 40,000 rpm ~4kW Thermal Equilibrium Data on Blower Test Stand

| | Hz | Power (Watts) | PF | Inlet T Deg F | Outlet T Deg F | Mot 1 T Deg F | Mot 2 T Deg F | Mot 3 T Deg F | Mot 3 T Deg F |
|---|---|---|---|---|---|---|---|---|---|
| Block Communicated Controller, 400 Vdc | 750.0 | 2917.0 | 0.94 | 83.84 | 218.59 | 167.58 | 197.10 | 202.89 | 190.31 |
| Block Communicated Controller, 300 Vdc | 750.0 | 2858.0 | 0.95 | 83.83 | 218.65 | 152.50 | 175.84 | 180.60 | 170.00 |
| Sinusoidal Controller with Sin Filter | 750.0 | 2860.0 | 0.97 | 84.40 | 219.00 | 143.00 | 163.00 | 169.00 | 157.00 |
| Block Communicated Controller, 200 Vdc | 750.0 | 2840.0 | 0.96 | 83.10 | 217.80 | 130.67 | 147.64 | 150.70 | 141.50 |
| Electrical Control System 50 | 750.0 | 2827.0 | 0.96 | 82.78 | 217.29 | 106.70 | 116.33 | 120.00 | 111.88 |

Fig. 29

ELECTRICAL CONTROL SYSTEM

RELATED PATENT APPLICATION

This application claims the benefit of U.S. provisional patent application Ser. No. 61/647,230 filed on May 15, 2012 by Robert Lyle Fuller of Conifer, Colo., U.S. and David J. Wehrlen of Evergreen, Colo., US.

TECHNICAL FIELD

The present invention relates generally to a system for controlling electrical power. More specifically, the present invention relates to the field of matched electrical power control circuitry to an electrical power device for assisting in increasing the efficiency of the electrical power device.

BACKGROUND OF INVENTION

In the ever present desire to reduce the size and weight of components, especially those that are in mobile applications, such as a vehicle for instance, the reduction of component size and weight while maintaining or improving overall component functionality is highly desirable. To effectuate this component size and weight reduction while at least maintaining component functionality, the power density of the component needs to increase, requiring advanced materials, construction techniques, and electrical power management.

In the case of an electrical motor as an example, increasing power density would typically entail increasing the motor rotational speed—basically to increase motor power output while reducing motor torque levels resulting in a smaller and lighter weight motor.

However, increasing motor speed creates a number of design issues to overcome that primarily occur in two areas, being the motor itself and electrical control of the motor. For the motor itself, the design issues would include structural integrity of the motor rotor to withstand high rotational speeds, motor rotor shaft bearings again to withstand high rotational speeds, clearances as between static and dynamic parts, and temperature rise considerations due to friction and electrical inefficiencies which become predominate at higher power densities, as smaller motor size equates to lower surface areas and lower volumes to absorb and shed heat buildup. A conventional lower rotational speed motor rotor construction (typically termed squirrel cage induction), utilizes a complex multi piece built-up rotor with iron plates and copper wire windings-being limited to a maximum rotational speed of about twenty thousand revolutions per minute (20,000 rpm) due to rotational centrifugal stress and excessive heat buildup in the iron and copper due to electrical inefficiency.

A high speed motor rotor is constructed of a permanent magnet which requires a structural reinforcement member to allow the permanent magnet to withstand high rotational speeds of around one hundred thousand revolutions per minute (100,000 rpm) or even higher rpm. Although the permanent magnet reduces the previously mentioned electrical inefficiency of the squirrel cage induction rotor, the addition of the structural reinforcement that is positioned between the high speed motor rotor and stator increases electrical inefficiency as the structural reinforcement acts as an electrical and physical barrier between the rotor permanent magnet and the rotating electromagnetic field of the stator. Although the structural reinforcement member is non-magnetic—it is constructed of a metallic material for the needed strength.

Another set of issues need to be dealt with in high speed motors are rotor speed sensing and rotor position sensing both in relation to the motor stator, both of which are needed for more optimum electrical control. On a conventional low speed motor, typically a Hall effect sensor or rotary encoder would be used for instance utilizing a rotor physical notch that passes by an electromagnetic field sensor every rotor revolution resulting in the electromagnetic field being periodically interrupted to thus give an indication of rotor speed and position. The Hall effect sensor works well, however, having drawbacks of size and structure needed to accommodate the sensor in proximity to the motor rotor plus the need for an asymmetrical discontinuity in the rotor to give the sensor a "read" section for rotor speed and position. The requirements of the sensor and asymmetrical discontinuity are generally not desirable in the high speed motor for several reasons; the sensor structure consumes physical space which on a proportional scale is problematic in a smaller high speed motor, plus in addition, the asymmetrical discontinuity in the rotor also consumes physical space and further interferes with achieving optimal rotor balance and causes added stress in the rotor, wherein desirable design in a high speed motor would dictate minimal physical structure space consumed and minimal rotor size that is completely symmetric in design.

Thus, in a high speed motor, eliminating the sensor and eliminating the asymmetrical discontinuity in the rotor are both highly desirable, however, there remains the need for knowing rotor position and speed for the motor controller to work in a more optimum manner, so these items of rotor position and rotor speed must be determined in another manner without a physical sensor and rotor asymmetrical discontinuity. The result would be a "sensorless" way to determine rotor position and rotor speed—i.e. meaning that the high speed motor has none or minimal added components within the high speed motor itself—so as not to interfere with optimal high speed motor design, which leads to a method and structure external to the high speed motor to determine rotor position and speed electronically as a unique way to more optimally control a high speed motor, which incidentally would typically be of a smaller size to accommodate very high rotor speeds as previously discussed.

One sensorless high speed motor solution is to use motor back electromotive force (EMF) as a way to determine motor rotor speed and rotor position while the motor is operational—i.e. the rotor is rotating, however, having the problems that no back EMF is generated when the motor rotor is stopped, which can lead to rotor position error at motor startup, which could cause reverse rotor rotation. Another solution is to embed in the stator winding a way of measuring stator winding electrical activity to derive rotor position and rotor speed. In both of these scenarios, either the EMF signal or the stator winding electrical activity signal must be significantly processed to produce meaningful output based upon test data.

High-speed turbo machines, such as turbochargers, or air blowers have been or are being developed to take advantage of new areas of technology enabled by these permanent magnet brushless direct current motors termed BLDC motors, also accompanying advances in microcontrollers, micro control units termed MCUs, field programmable gate arrays termed FPGAs, and power switching transistors circuits, have enabled significant advances in motor controllers. Thus, these high-speed permanent magnet brushless direct current motors are characterized by the desire for high power density, a wide speed range, and high acceleration rates that go considerably beyond conventional electric motor capabilities. The potential for the high power density of a permanent magnet brushless direct current motor that is coupled with the desire for reduced production costs, leads to a magnetic topology that requires proper current control to minimize motor, and to some extent control system, losses.

The most practical and lowest cost control for these permanent magnet brushless direct current motors is a three phase alternating current with a six switch inverter that is operated with block commutation. As a phase is energized the current rises to a set point and pulse width modulation or as termed PWM is employed to provide the calculated energy to a phase for a calculated duration of time based on motor demand. The PWM frequency can be chosen for a variety of reasons, however, in high-speed motor control, the highest practical switch speed has to be utilized to achieve very high frequencies, further PWM is used to provide desirable symmetrical sine wave forms to the motor. In contrast to this requirement, several loss mechanisms with the controller and motor are tied to the frequency content of the current waveforms, with losses tending to rise with increasing frequency or increased motor rotational speed. This results in a trade-off between high losses and usable motor speed. Limitations on the preferred switch type, being preferably an insulated gate bipolar transistor or as termed IGBT are typically capable of about 20 to 25 kHz maximum or are potentially limited by the maximum allowable losses in the system design, other switching transistors could be metal oxide semiconductor field effect transistors or as termed MOSFET or related equivalents. The problem with this is that it results in high switching losses and limits upon the motor rotational speed achievable.

High-speed motor design for the permanent magnet brushless direct current motor typically results in a two pole machine with a slug or ring magnet utilized. These particular motors have distributed windings that can yield trapezoidal or sinusoidal back electromotive forces termed EMF, wherein the motor EMF is a function of motor shaft rotational speed. Current day high-energy magnet materials include Neodymium Iron Boron or Samarium Cobalt which being somewhat similar to a ceramic material in a strength of materials nature, are reasonably tolerant of compressive stress and intolerant of tensile stress. For this reason, the magnet is often retained with an interference fit metal band or a cylindrical "can" over the magnets thus keeping the magnets in a compressive prestressed state such that the magnets do not experience tensile stress associated with high levels of centrifugal force due to high motor rotational shaft speeds. This of course brings in a complication as this metal "can" or could be termed a structural reinforcement sleeve needs to have fairly high strength in a tensile manner and also have high electrical resistivity to minimize eddy current losses during BLDC motor operation.

The structural metal magnet reinforcement sleeve requires a more sinusoidal current waveform or a waveform with reduced harmonic content, and motor airgap flux density profile, in order to prevent rotor eddy current losses. Controllers are designed for these motors using sinusoidal current waveforms and sine wave filters to provide the desired sinusoidal current waveform or reduced harmonic content waveform. The sine wave controller with prior art sine wave filters is typically large, expensive, and inefficient with a limited optimum speed range. Utilizing simple block commutation as previously described with a high-speed metal structural sleeve banded motor rotor results in current waveforms and subsequent motor air gap flux profiles that cause excessive rotor heating and thus motor inefficiency.

In looking at the prior art in this area in U.S. Pat. No. 6,424,798 to Kitamine, disclosed is a sensorless brushless-DC-motor mounted on an electric or hybrid vehicle that is powered by an on-board battery through an inverter supplying a three-phase pulse width modulated voltage (PWM voltage). In Kitamine, the inverter is controlled to generate the PWM voltage having an average voltage level corresponding to a target motor speed. The PWM voltage level in Kitamine is controlled by changing its duty ratio, so that a difference between the target motor speed and an actual motor speed is minimized. The actual motor speed in Kitamine is determined based on a signal indicating a rotor position detected from the PWM voltage imposed on the motor, wherein the rotor position circuit (element 13) is shown in FIG. 2, with the circuit eliminating a carrier frequency from the PWM voltage to determine a rotor position through voltage differential between phase voltage and average motor voltage, with a speed detector (element 14) which calculates motor speed as a reciprocal of a cyclic period of pulse signals indicating rotor position. When the battery voltage drops in Kitamine and the duty ratio becomes 100%, the target motor speed is temporarily reduced to the level of the actual motor speed, further when the battery voltage is recovered and the duty ratio becomes lower than 100%, the target motor speed is gradually increased again to the original level. In this manner in Kitamine, even if the battery voltage abruptly increases, the PWM voltage is properly controlled, and thereby the motor is stably driven without causing loss of synchronism.

Continuing in the prior art, in U.S. Pat. No. 5,345,156 to Moreira, disclosed is a method and apparatus for operating a brushless permanent magnetic motor at speeds where zero crossings of stator phase voltages becomes unavailable, wherein applications of stator currents to one stator phase is temporarily halted to allow current in the phase to reach zero, and the zero crossings of the internal motor voltage is detected as a surrogate for the zero crossings of the stator phase back EMF. Thus a controller in Moreira can react to the detected zero crossings as if the phase current was being applied, in using a processes third harmonic component of the stator voltage in conjunction with back EMF of a single phase for motor control.

Next, in the prior art in U.S. Pat. No. 8,138,694 to Steigerwald, et al., disclosed is a bidirectional buck-boost power converter 13 including a pair of inverter modules 14, 15 disposed at an output of a machine, and an inductor L connected between the pair of inverter modules 14, 15. Thus in Steigerwald, a method for controlling a voltage output of a machine (turbine) starter generator having an inverter rectifier and bidirectional buck-boost converter, includes outputting a DC voltage controlled by bidirectional buck-boost pulse width modulation (PWM) switching control, when the starter generator is in a generator mode.

Further, in the prior art in U.S. Pat. No. 8,080,960 to Rozman, et al., disclosed is a flux regulated permanent magnet brushless motor with a stator having an inner peripheral bore. In Rozman, a permanent magnet rotor is mounted within the inner peripheral bore and a control winding is supplied to a DC current to regulate flux of the machine with a small AC current also being supplied, wherein an output is sensed to determine a position of the permanent magnet rotor.

Next in the prior art in U.S. Pat. No. 7,230,361 to Hirzel, disclosed is an electric device, such as an electric motor, a generator, or a regenerative motor, having a wound stator core made from advanced low-loss material. In preferred embodiments in Hirzel, the electric device is an axial airgap-type configuration wherein the invention provides an electric device having a high pole count that operates at high commutating frequencies, with high efficiency and high torque and power densities. Thus in Hirzel, advanced low-loss materials exploited by the present invention include amorphous metals, nanocrystalline metals, and optimized Fe-based alloys.

What is needed is a low cost, compact, and efficient controller that has a more sinusoidal current waveform or a waveform with reduced harmonic content, to operate the low cost type permanent magnet brushless direct current motor. Thus, the solution that is disclosed is a block commutation type controller that when operated at the proper direct current source voltage has desirable attributes to control the low-cost BLDC motor type. The direct current supply voltage, when operated to match the motor operating back EMF, or slightly above the motor operating back EMF, results in a more sinusoidal waveform or a lower harmonic content waveform, and in current control mode the switching transistors no longer have PWM and transition to full on or off mode. Wherein a usable controller-motor results in being able to shift the design point dynamically in relation to motor rotor speed, as opposed to a prior art controller that utilizes a set input voltage resulting in a single motor rotor speed design point. Thus, in other words, the maximum IGBT switching rate and all the other rate related losses are reduced significantly due to the elimination of PWM when the voltage used to feed the direct current controller is at a level just slightly in excess of the peak voltage produced by the motor/generator at the desired operating speed. The ideal excess voltage is determined by the sum of the voltage drops for the controller, the BLDC motor/generator, and all associated wiring at the current level required to maintain the desired speed.

The difficulty with maintaining this condition is that the required voltage changes with every change to the desired speed of the motor output shaft and further with a shaft load at that speed, thus being a very dynamic condition. In addition, this operating mode will dramatically limit the available power at a low motor shaft output speed due to the linear relationship between speed and output voltage. Thus, a structure and method is disclosed that provides numerous advantages for the operation of very high rotational speed BLDC motor/generators.

Further as an alternative option to using back EMF is to embed in the motor stator winding a wire loop for measuring stator winding electrical activity to derive rotor position and rotor speed through a processed signal from the wire loop. In both of these scenarios, either the EMF signal or the stator winding electrical activity signal must be significantly processed to produce meaningful output based upon test data and further an optional look up table of known values can augment the EMF signal or the stator winding electrical activity signal for increasing accuracy in determining motor rotor speed and position in a sensorless manner.

SUMMARY OF INVENTION

Broadly, the present invention is an electrical control system that includes a direct current to direct current converter and/or regulator circuit that receives a direct current supply system power input, wherein the regulator outputs a controlled voltage direct current inverter circuit power feed. Further included in the electrical control system is an inverter circuit assembly that is in electrical communication with the regulator and receives the controlled voltage direct current inverter power feed, wherein the inverter outputs an alternating current motor power feed. Also included in the electrical control system is a permanent magnet brushless direct current motor that is in electrical communication with the inverter and receives the alternating current motor power feed, wherein the motor outputs a shaft rotational speed and a back electromotive force. In addition, for the electrical control system a means is provided for regulating the controlled voltage direct current inverter circuit power feed based upon criteria utilizing the motor shaft rotational speed and the back electromotive force to substantially make the controlled voltage proportional to the back electromotive force to reduce a pulse width modulation switching frequency to further smooth the alternating current waveform to increase motor efficiency.

Also as an alternative to the back electromotive force, an embedded auxiliary stator wire loop that generates a signal that is processed can be utilized for determining motor rotor speed and rotor position relative to the motor stator windings much as the back electromotive force does. Further a voltage look-up table can optionally be used to increase the accuracy of determining the motor rotor speed and rotor position relative to the motor stator windings for the regulator to use.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 29 shows a test data table showing the reduction in motor temperatures resulting from the matched voltage motor power feed of the present invention from the controlled voltage regulator culminating from the smoothed waveform feed to the motor;

REFERENCE NUMBERS IN DRAWINGS

Figure 1:
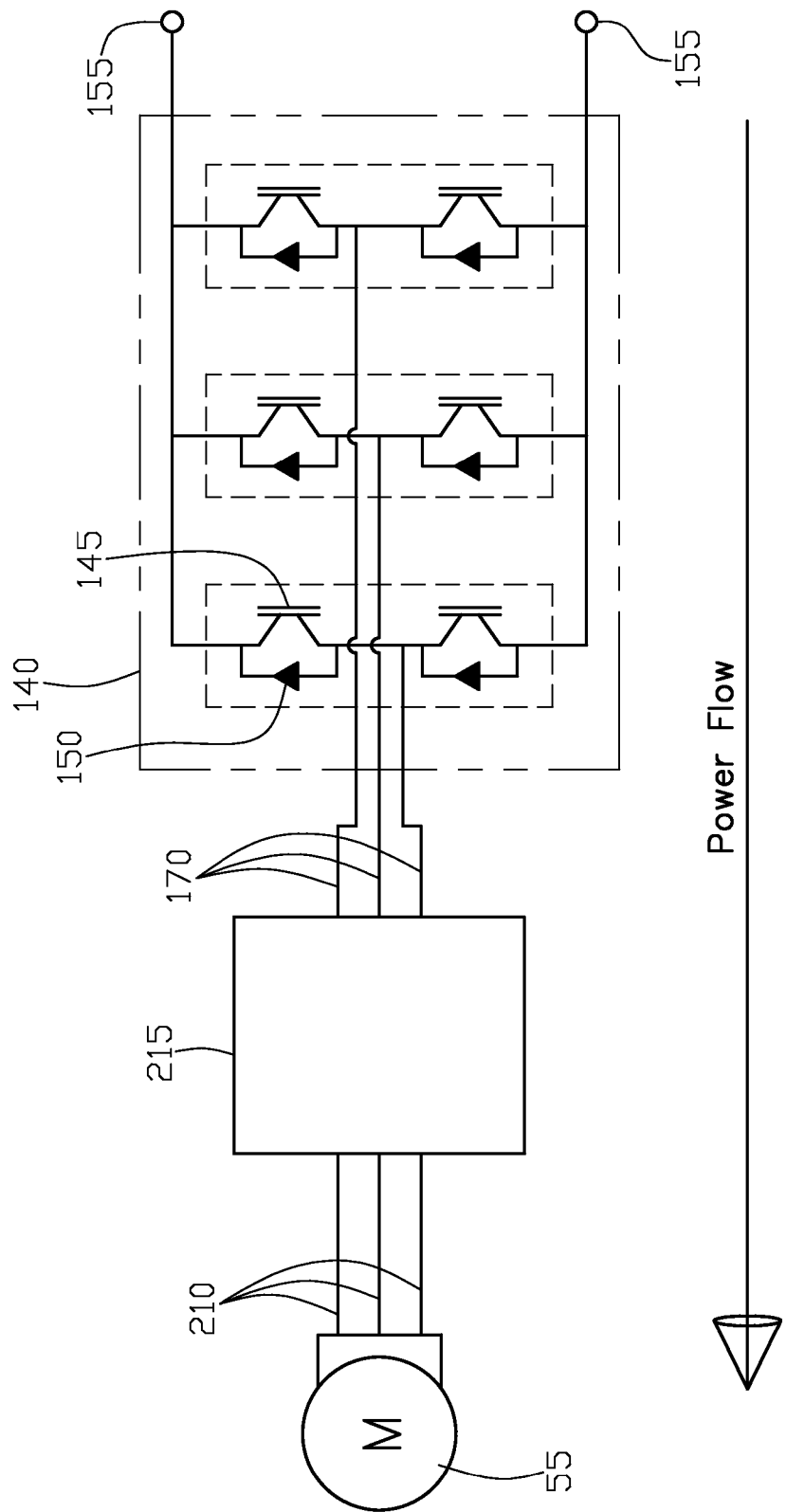
FIG. 1 shows a schematic diagram of a typical prior art system that includes a high speed permanent magnet motor, a smoothed three phase alternating current, a sine wave smoother filter, a higher pulse width modulation three phase alternating current, and an inverter circuit assembly with a direct current supply system power input.

50 Electrical Control System
51 Alternative embodiment of the electrical control system
52 Second alternative embodiment of the electrical control system
53 Third alternative embodiment of the electrical control system
55 High speed permanent magnet brushless direct current (BLDC) motor assembly
60 Rotor of the motor 55
65 Rotor shaft of the motor 55
70 Permanent magnet of rotor 60
75 Structural reinforcement sleeve of rotor 60
80 Sleeve thickness
90 Rotor rotational direction of motor 55
95 Rotor shaft 65 rotational speed of motor 55
100 Back Electromotive Force (EMF) of motor 55
101 Signal generated from auxiliary stator wire loop 106
102 Summary schematic block diagram circuitry for signal 101 processing
105 Excess voltage-sum of voltage drops
106 Auxiliary stator wire loop to generate signal 101
107 Wire loop system including the wire loop 106, the signal 101, the circuitry 102, and the means 235
110 Stator of motor 55
115 Air gap-radial of rotor 60 to stator 110
120 Stator slot gap-tangential
125 Stator core
126 Stator wire windings
127 Slot gap pitch
130 Slot ripple effect
135 Ratio of slot gap 120 to air gap 115
140 Controller inverter circuit assembly
145 Inverter switch-Insulated Gate Bi-polar Transistor (IGBT) of inverter assembly 140
150 Freewheeling diode of inverter switch 145
155 Direct current (DC) supply system power input
160 Direct current (DC) to direct current (DC) converter regulator circuit
165 Controlled voltage direct current (DC) inverter circuit 140 power feed
166 Buck/boost regulator that includes the DC to DC converter regulator circuit 160 and the controlled voltage power feed 165
167 Auxiliary load circuit
170 Three phase higher pulse width modulation alternating current (AC) output (high frequency variable) motor 55 power feed
171 Three phase lower pulse width modulation alternating current (AC) output (high frequency variable) motor 55 power feed
175 Motor 55 flux density range of 0.1 to 0.3 Tesla
180 Motor 55 flux density range of 0.3 to 0.8 Tesla
185 Motor 55 flux density range of 0.8 to 1.75 Tesla
190 Sine wave
195 Sine wave electrical frequency
200 Sine wave amplitude or relative air gap flux density (T)
205 Sine wave flux density
210 Smoothed (near symmetrical) lower harmonic alternating current wave form with reduced harmonic content
215 Sine wave smoother filter-prior art
225 Means for regulating the controlled voltage direct current inverter 140 circuit power feed 165 based upon criteria utilizing the back electromotive force 100 or the motor 55 load 300 to substantially make the controlled voltage proportional 165 to the back electromotive force 100 or motor 55 load 300 to reduce the pulse width modulation switching frequency to further smooth with reduced harmonic content 210 the alternating current waveform 190 to increase motor 55 efficiency, regulator efficiency 160, and electromagnetic compatibility for reduced filtering.
230 Differential cross voltage between 165 and 100 being approximately equal to the sum of the voltage drops 105
235 Means for regulating the controlled voltage direct current inverter 140 circuit power feed 165 based upon criteria utilizing the signal 101 from the auxiliary stator wire loop 106 that is processed by circuitry 102 to substantially make the controlled voltage proportional to a motor rotor rotational speed and a motor rotor relative rotational position to the stator winding to reduce the pulse width modulation switching frequency to further smooth with reduced harmonic content 210 the alternating current waveform 190 to increase motor 55 efficiency, regulator efficiency 160, and electromagnetic compatibility for reduced filtering.
300 Torque load that can either be positive (driving the motor 55 to be a generator) or negative to consume power from the motor 55
310 Motor 55 temperature at position location one (1)
315 Motor 55 temperature at position location two (2)
320 Motor 55 temperature at position location three (3)
325 Motor 55 temperature at position location four (4)

DETAILED DESCRIPTION

Figure 13:
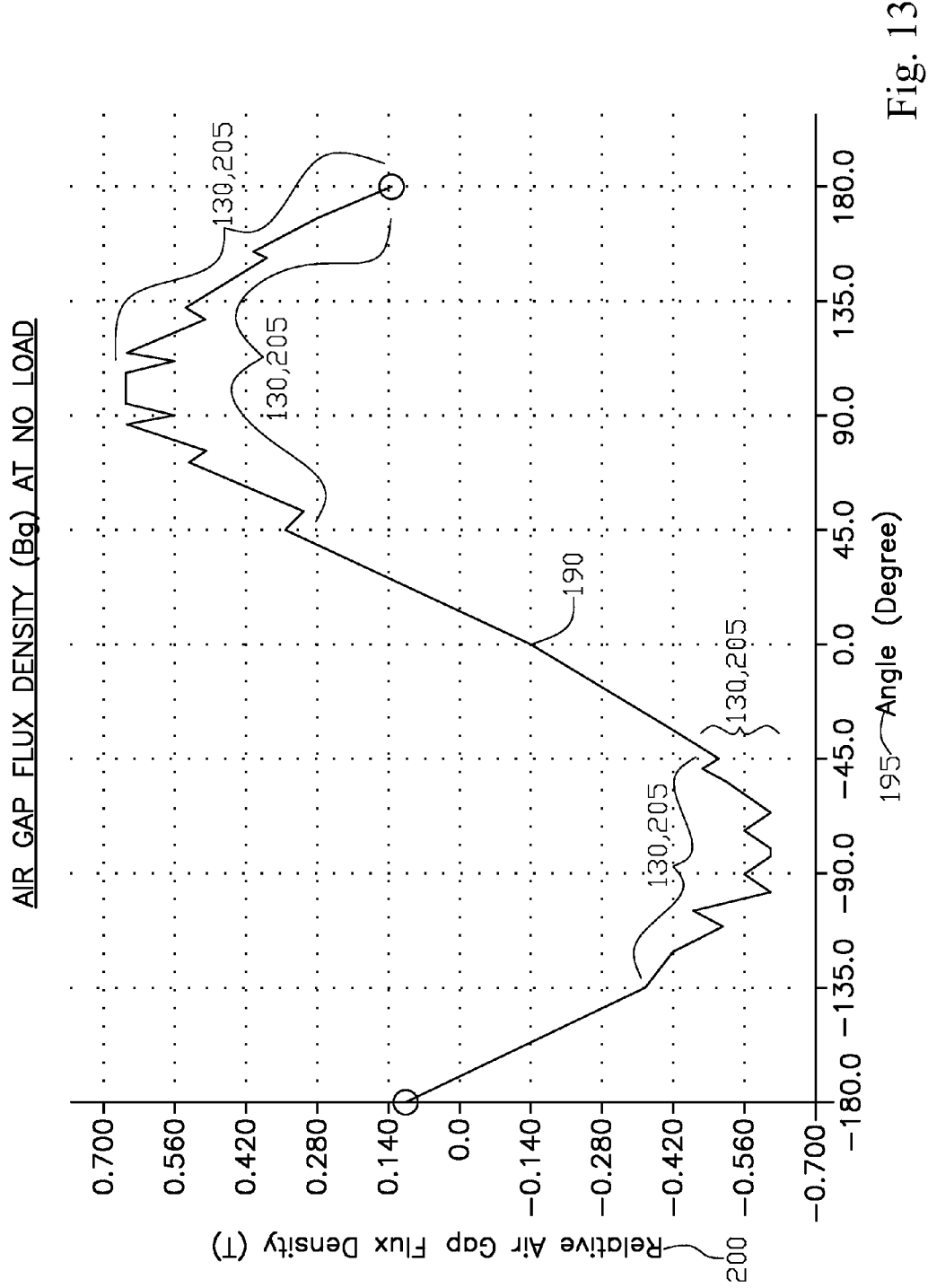
FIG. 13 shows a motor air gap flux density for the motor at no load wherein the flux density is shown as a deviation ripple effect from a current wave through a cycle.
Figure 14:
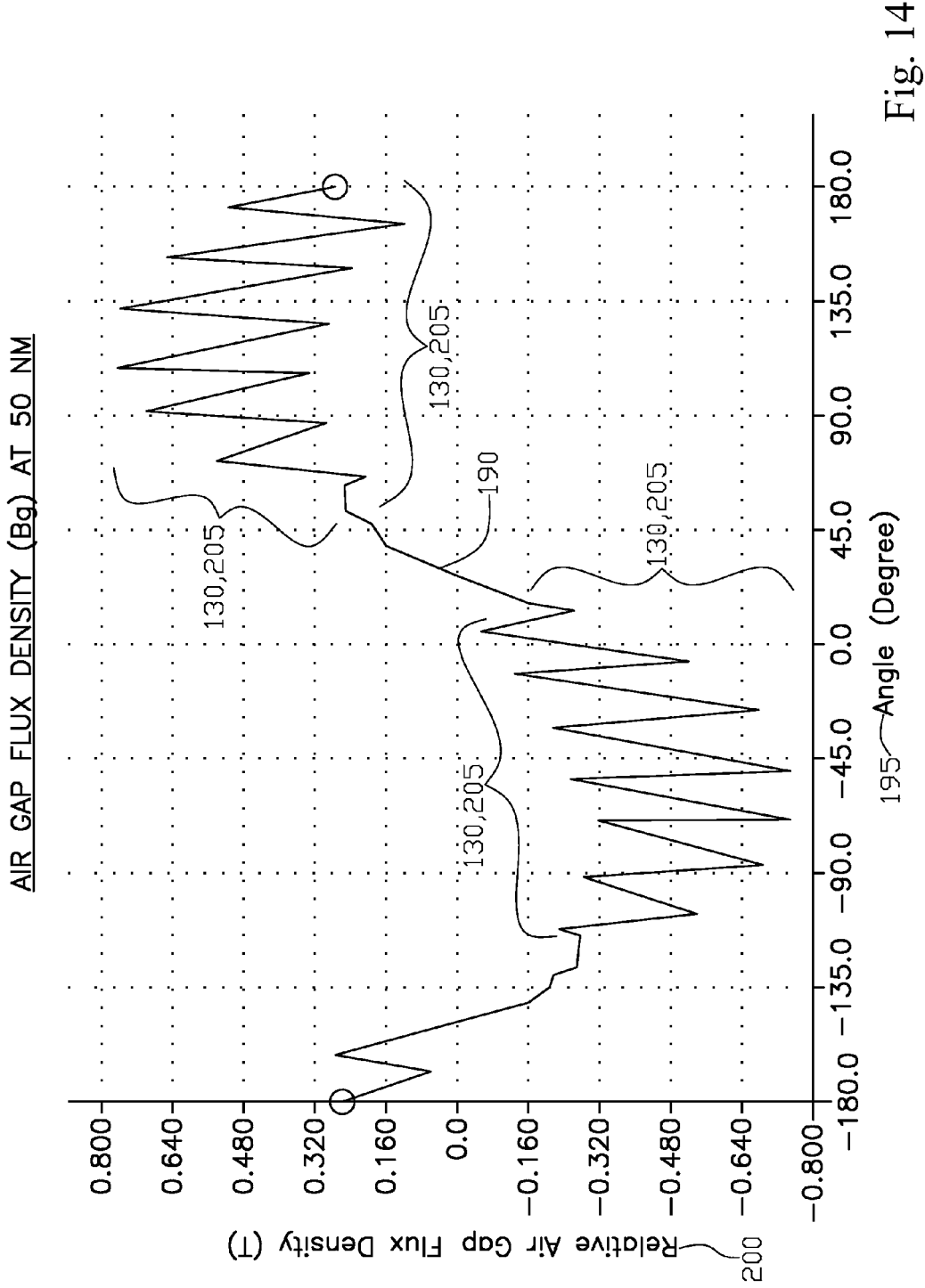
FIG. 14 shows a motor air gap flux density for the motor at a 50 Newton-Meter load wherein the flux density is shown as an undesirable intensified deviation ripple effect from a sine wave through a cycle, wherein the present invention drives FIG. 14 more towards FIG. 13.

With initial reference to FIG. 1, shown is a schematic diagram of a typical prior art electrical control system that includes a high speed permanent magnet motor 55, a smoothed three phase alternating current wave 210, a sine wave smoother filter 215—that is typically required to reduce the pulse width modulation wave 210 flux density effect 205—as an example see FIG. 14 compared to the improved FIG. 13, as the filter 215 enervates the wave 210 flux density effect 205 from a higher pulse width modulation three phase alternating current 170 output from an inverter circuit assembly 140 with a direct current supply system power input 155.

Figure 2:
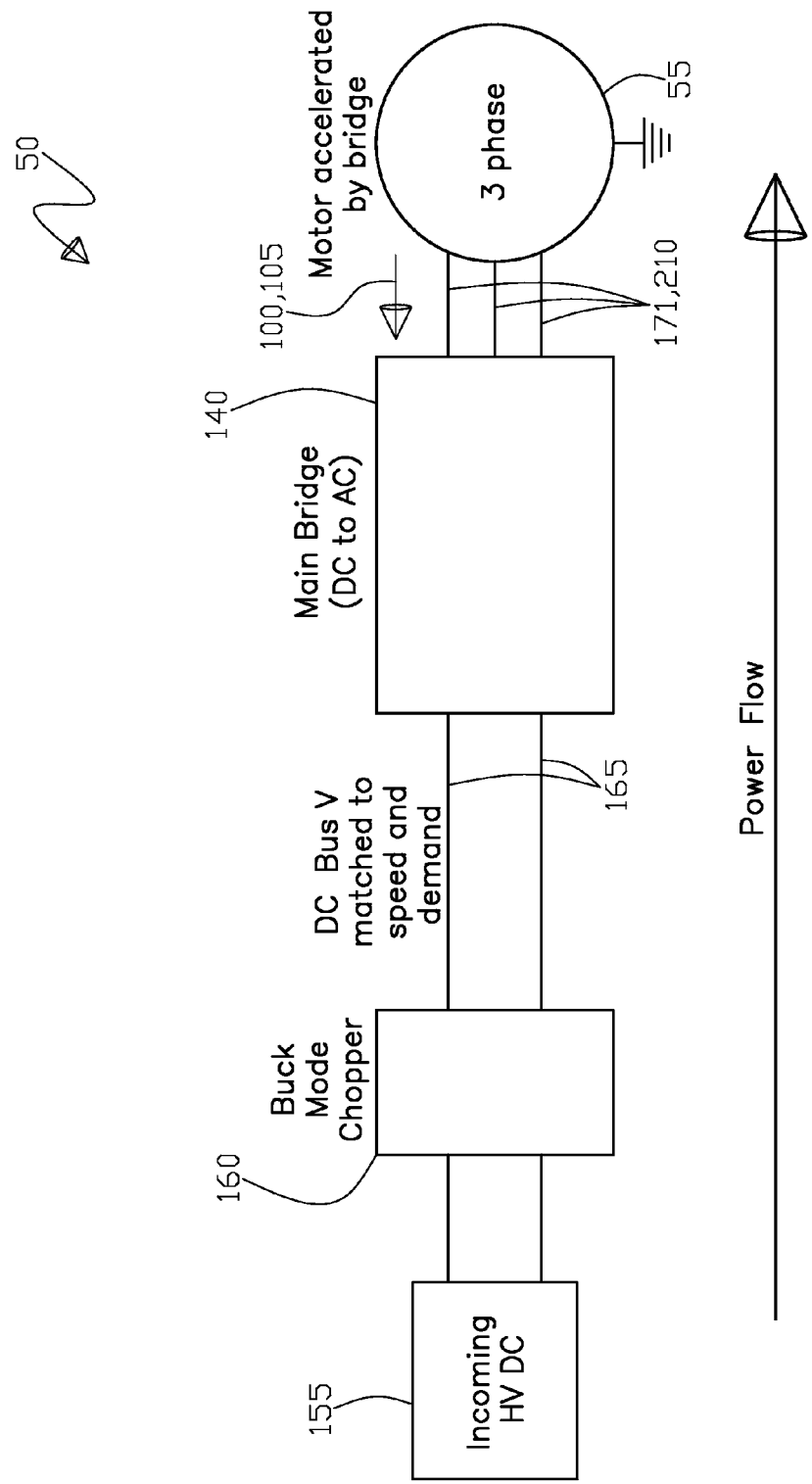
FIG. 2 shows a schematic block diagram of the present invention electrical control system that includes a higher voltage direct current supply system power input, a direct current to direct current converter regulator circuit, a controlled voltage direct current inverter circuit power feed, the inverter circuit assembly, a lower pulse width modulation smoothed three phase alternating current, and the high speed permanent magnet motor with back electromotive force and voltage drops shown.

Next, FIG. 2 shows a schematic block diagram of the present invention electrical control system 50 that includes a higher voltage direct current supply system power input 155, a direct current to direct current converter regulator circuit 160, a controlled voltage direct current inverter circuit power feed 165, the inverter circuit assembly 140, a lower pulse width modulation smoothed three phase alternating current 171 for a smoothed lower harmonic wave form 210, and the high speed permanent magnet motor 55 with back electromotive force 100 and voltage drops shown 105.

Figure 3:
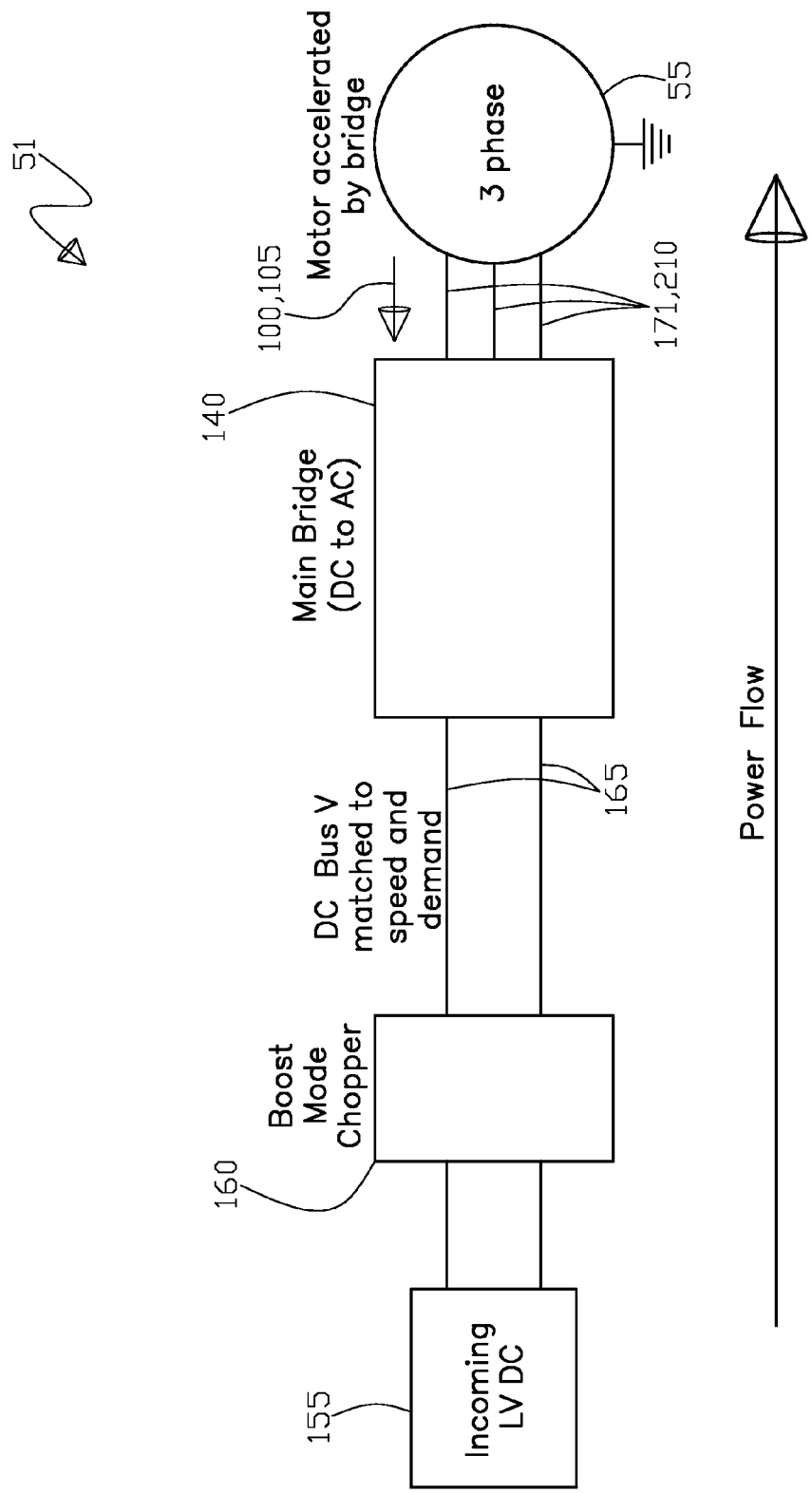
FIG. 3 shows a schematic block diagram of an alternative embodiment of the present invention electrical control system that includes a lower voltage direct current supply system power input, a direct current to direct current converter regulator circuit, a controlled voltage direct current inverter circuit power feed, the inverter circuit assembly, a lower pulse width modulation smoothed three phase alternating current, and the high speed permanent magnet motor with back electromotive force and voltage drops shown.

Continuing, FIG. 3 shows a schematic block diagram of an alternative embodiment of the present invention electrical control system 51 that includes a lower voltage direct current supply system power input 155, a direct current to direct current converter regulator circuit 160, a controlled voltage direct current inverter circuit power feed 165, the inverter circuit assembly 140, a lower pulse width modulation smoothed three phase alternating current 171 for a smoothed lower harmonic wave form 210, and the high speed permanent magnet motor 55 with back electromotive force 100 and voltage drops shown 105.

Figure 4:
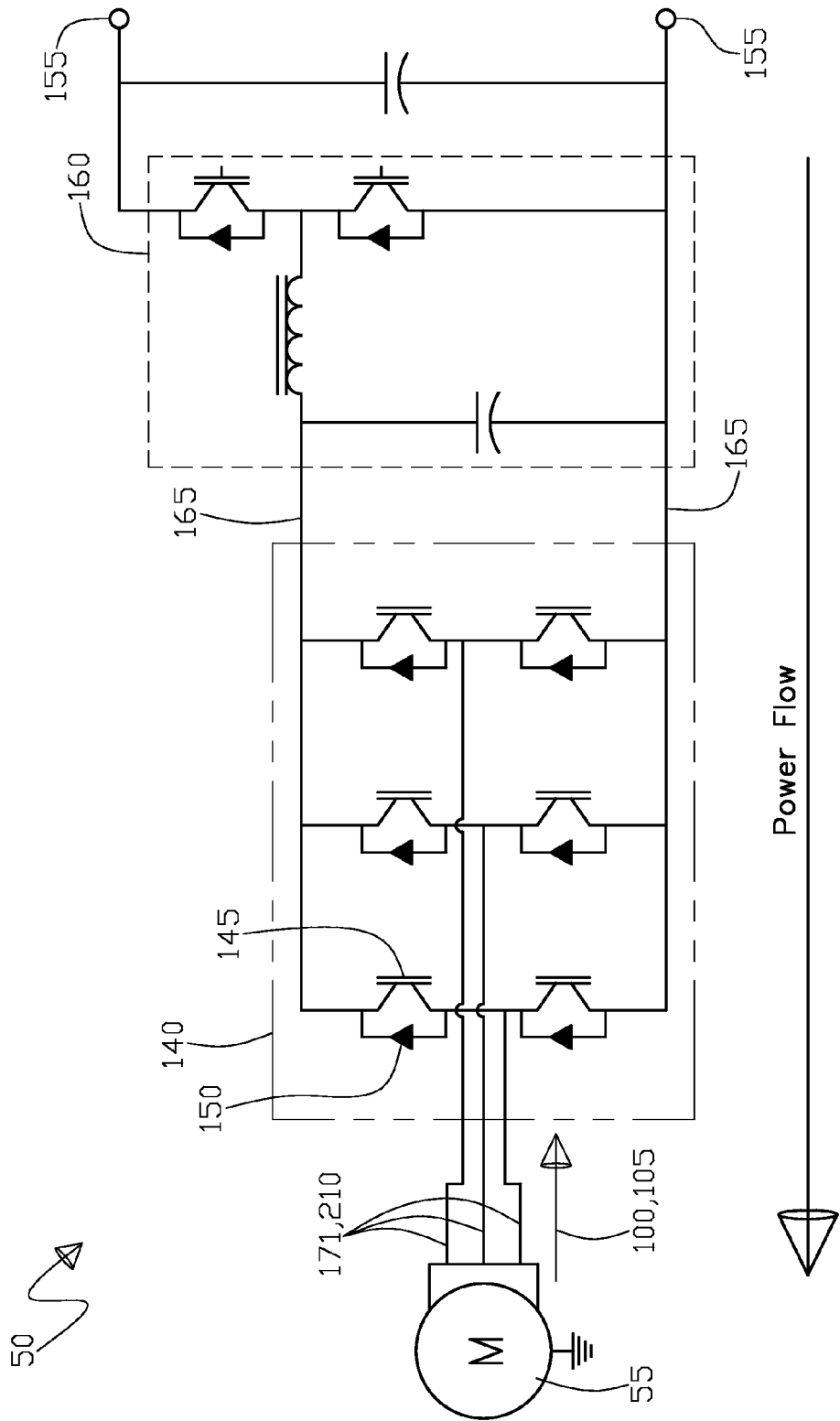
FIG. 4 shows an expanded schematic view of FIG. 2, of the present invention electrical control system that includes a higher voltage direct current supply system power input, a direct current to direct current converter regulator circuit, a controlled voltage direct current inverter circuit power feed, the inverter circuit assembly with inverter switches and freewheeling diodes, a lower pulse width modulation smoothed three phase alternating current, and the high speed permanent magnet motor with back electromotive force and voltage drops shown.

Further, FIG. 4 shows an expanded schematic view of FIG. 2, of the present invention electrical control system 50 that includes a higher voltage direct current supply system power input 155, a direct current to direct current converter regulator circuit 160, a controlled voltage direct current inverter circuit power feed 165, the inverter circuit assembly 140 with inverter switches 145 and freewheeling diodes 150, a lower pulse width modulation smoothed three phase alternating current 171 for a smoothed lower harmonic wave form 210, and the high speed permanent magnet motor 55 with back electromotive force 100 and voltage drops shown 105.

Figure 5:
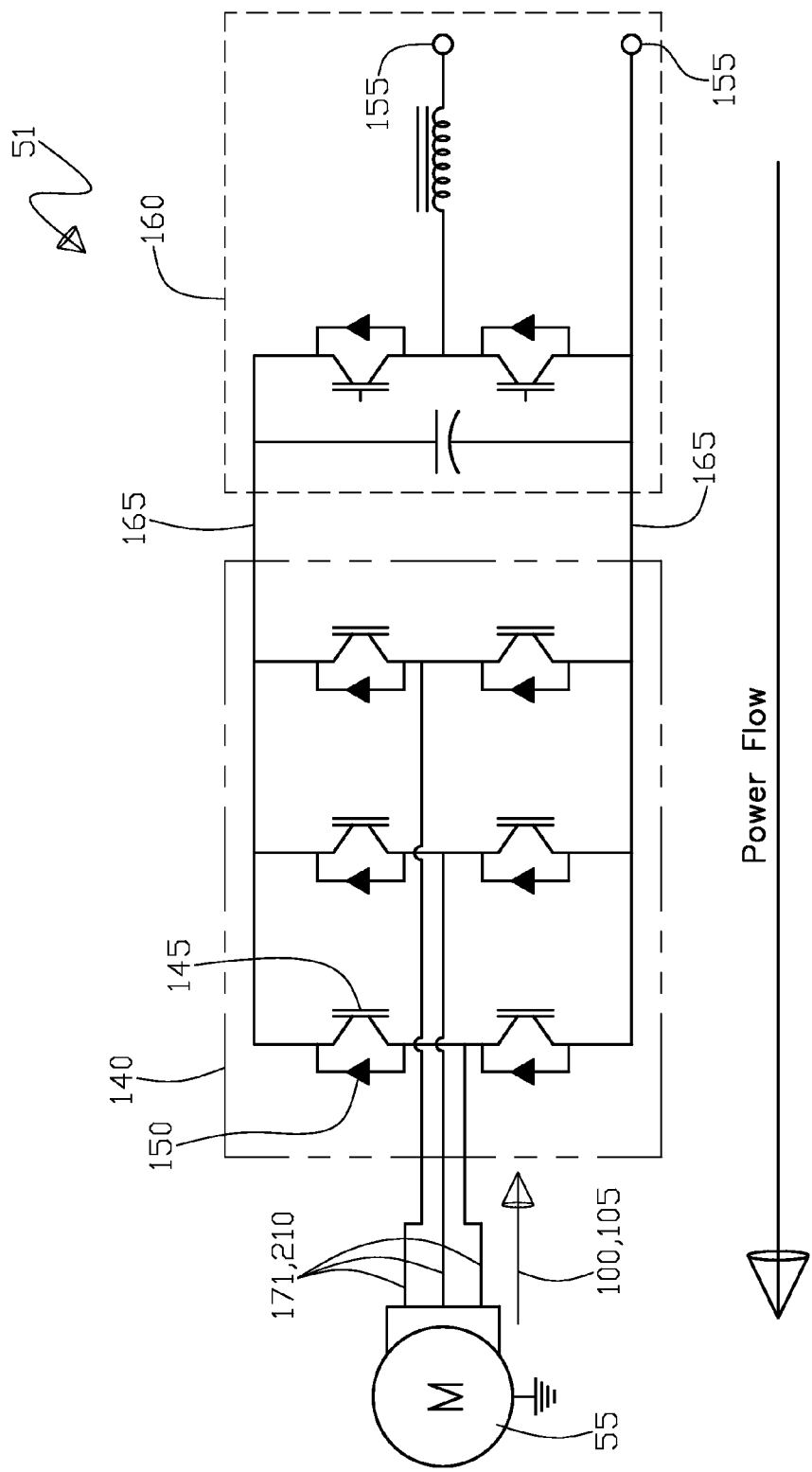
FIG. 5 shows an expanded schematic view of FIG. 3, of the alternative embodiment of the present invention electrical control system that includes a lower voltage direct current supply system power input, a direct current to direct current converter regulator circuit, a controlled voltage direct current inverter circuit power feed, the inverter circuit assembly with inverter switches and freewheeling diodes, a lower pulse width modulation smoothed three phase alternating current, and the high speed permanent magnet motor with back electromotive force and voltage drops shown.

Yet further, FIG. 5 shows an expanded schematic view of FIG. 3, of the alternative embodiment of the present invention electrical control system 51 that includes a lower voltage direct current supply system power input 155, a direct current to direct current converter regulator circuit 160, a controlled voltage direct current inverter circuit power feed 165, the inverter circuit assembly 140 with inverter switches 145 and freewheeling diodes 150, a lower pulse width modulation smoothed three phase alternating current 171 for a smoothed lower harmonic wave form 210, and the high speed permanent magnet motor 55 with back electromotive force 100 and voltage drops shown 105.

Figure 6:
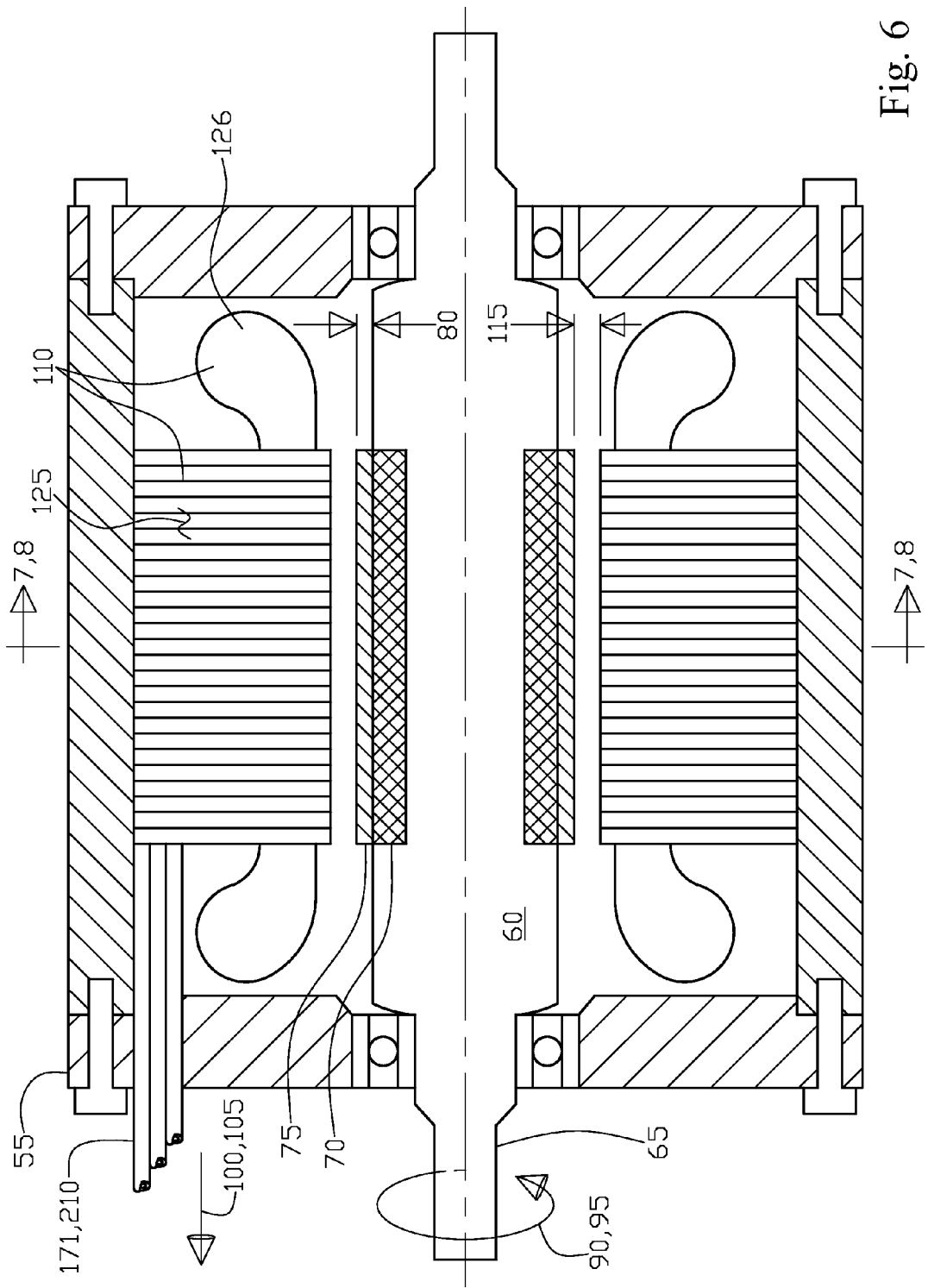
FIG. 6 shows a cross section of the high speed permanent magnet motor including a rotor with a shaft, shaft rotation and speed, a permanent magnet, a structural reinforcement sleeve, a sleeve thickness, further a stator including a core, windings, also an air gap, with the three phase lower pulse width modulation alternating current motor power feed in addition to the electromotive force and the voltage drops.

Next, FIG. 6 shows a cross section of the high speed permanent magnet motor 55 including a rotor 60 with a shaft 65, a shaft rotation 90 and speed 95, a permanent magnet 70, a structural reinforcement sleeve 75, a sleeve thickness 80, further a stator 110 including a core 125, windings 126, also an air gap 115, with the three phase lower pulse width modulation alternating current motor power feed 171 for a smoothed lower harmonic wave form 210 in addition to the electromotive force 100 and the voltage drops 105.

Figure 7:
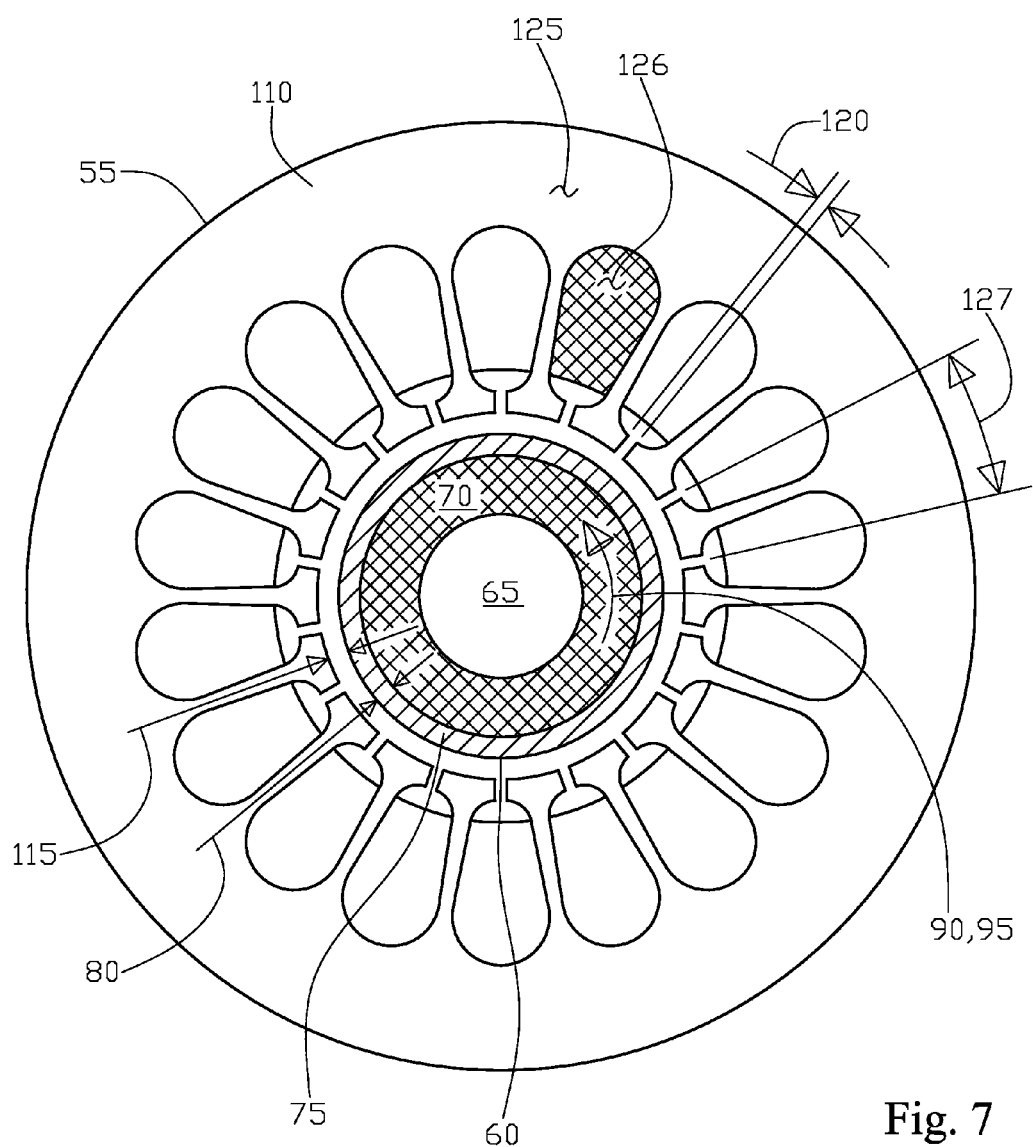
FIG. 7 shows cross section cut 7-7 from FIG. 6 showing the high speed permanent magnet motor including the rotor with the shaft, the shaft rotation and speed, the permanent magnet, the structural reinforcement sleeve, the sleeve thickness, further a stator including the core, the windings, the air gap, a slot gap, and a slot pitch.
Figure 8:
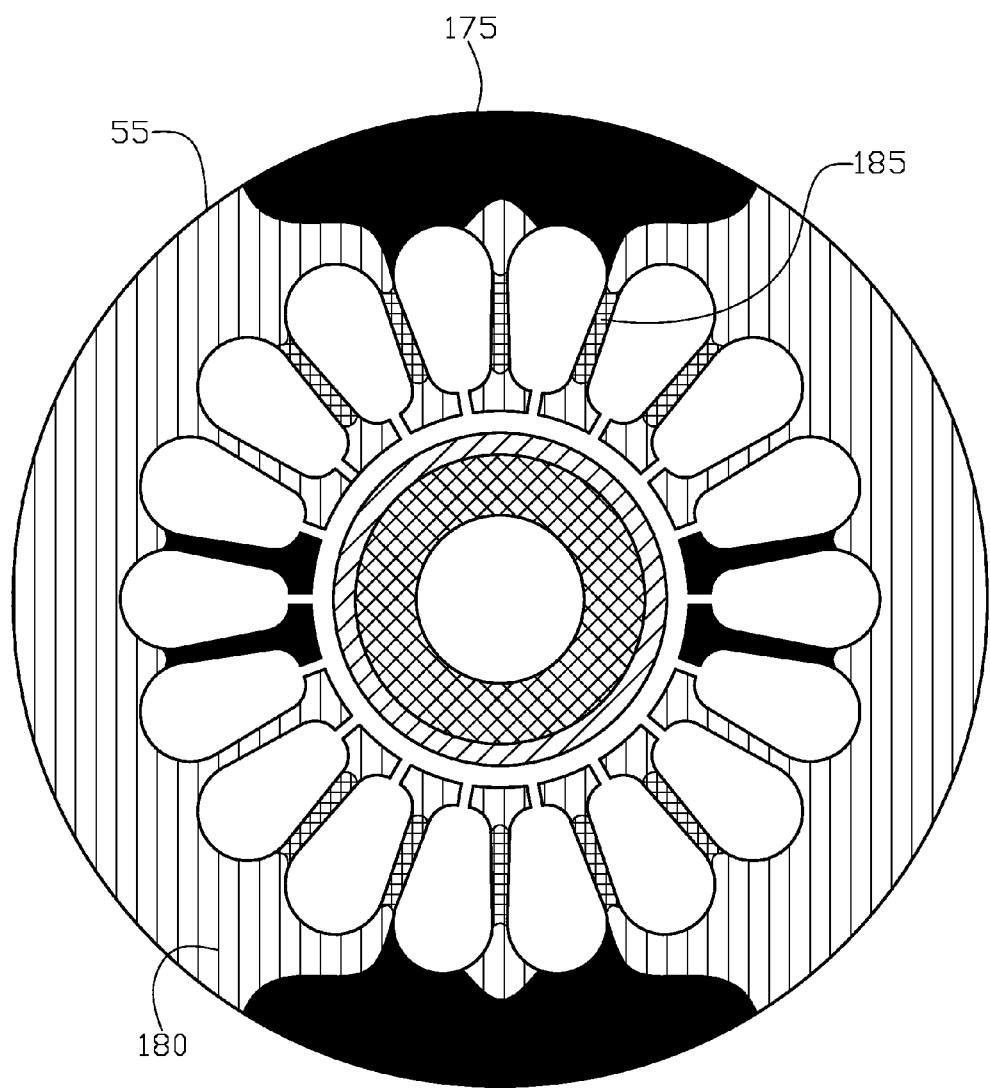
FIG. 8 shows cross section cut 8-8 from FIG. 6 showing a motor flux density profile drawing of the high speed permanent magnet motor that indicates areas of low, medium, and high flux densities in Tesla for the motor at no load.

Continuing, FIG. 7 shows cross section cut 7-7 from FIG. 6 showing the high speed permanent magnet motor 55 including the rotor 60 with the shaft 65, the shaft rotation 90 and speed 95, the permanent magnet 70, the structural reinforcement sleeve 75, the sleeve thickness 80, further a stator 110 including the core 125, the windings 126, the air gap 115, a slot gap 120, and a slot pitch 127. Next, FIG. 8 shows cross section cut 8-8 from FIG. 6 showing a motor flux density profile drawing of the high speed permanent magnet motor 55 that indicates areas of low 185, medium 180, and high 175 flux densities in Tesla for the motor 55 at no load.

Figure 9:
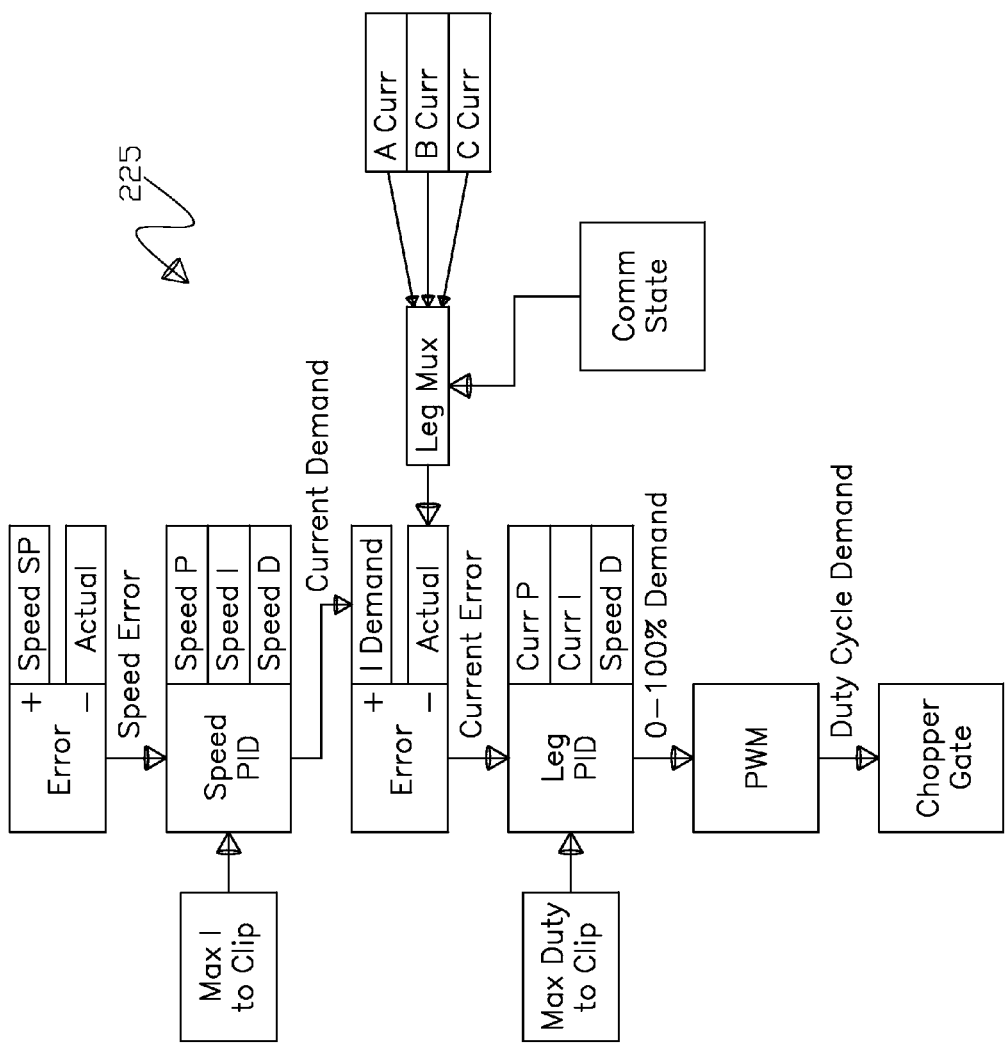
FIG. 9 shows a summary control diagram of motor logic with a means for regulating the controlled voltage direct current inverter circuit power feed showing a control loop feedback mechanism or proportional integral derivative control for motor rotational speed and back electromotive force to make the controlled voltage approximately proportionally above the electromotive force by the sum of the voltage drops via pulse width modulation to the back electromotive force for the controlled voltage feed to the inverter.

Further, FIG. 9 shows a summary control diagram of motor 55 logic with a means 225 for regulating the controlled voltage direct current inverter circuit power feed 165 showing a control loop feedback mechanism or proportional integral derivative control termed PID for motor rotational speed 95 and back electromotive force 100 to make the controlled voltage 165 approximately proportionally 230 above the electromotive force 100 by the sum of the voltage drops 105 via pulse width modulation to the back electromotive force 100 for the controlled voltage feed 165 to the inverter 140. In addition, for FIG. 9, the control loop feedback mechanism or PID could also be integral derivative (ID) without the P or proportional integral (PI) without the D.

Figure 10:
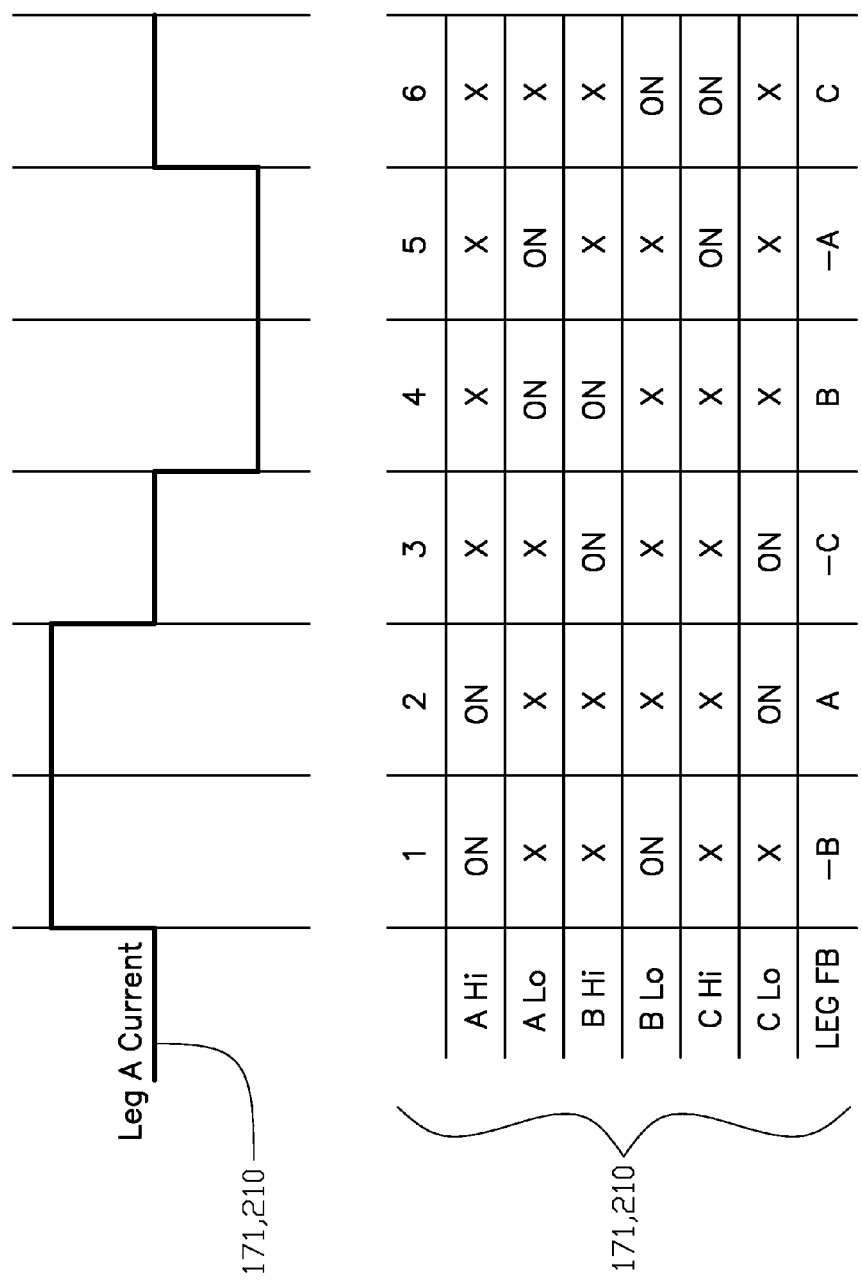
FIG. 10 shows a main bridge gate sequence with leg A current shown through a cycle.
Figure 11:
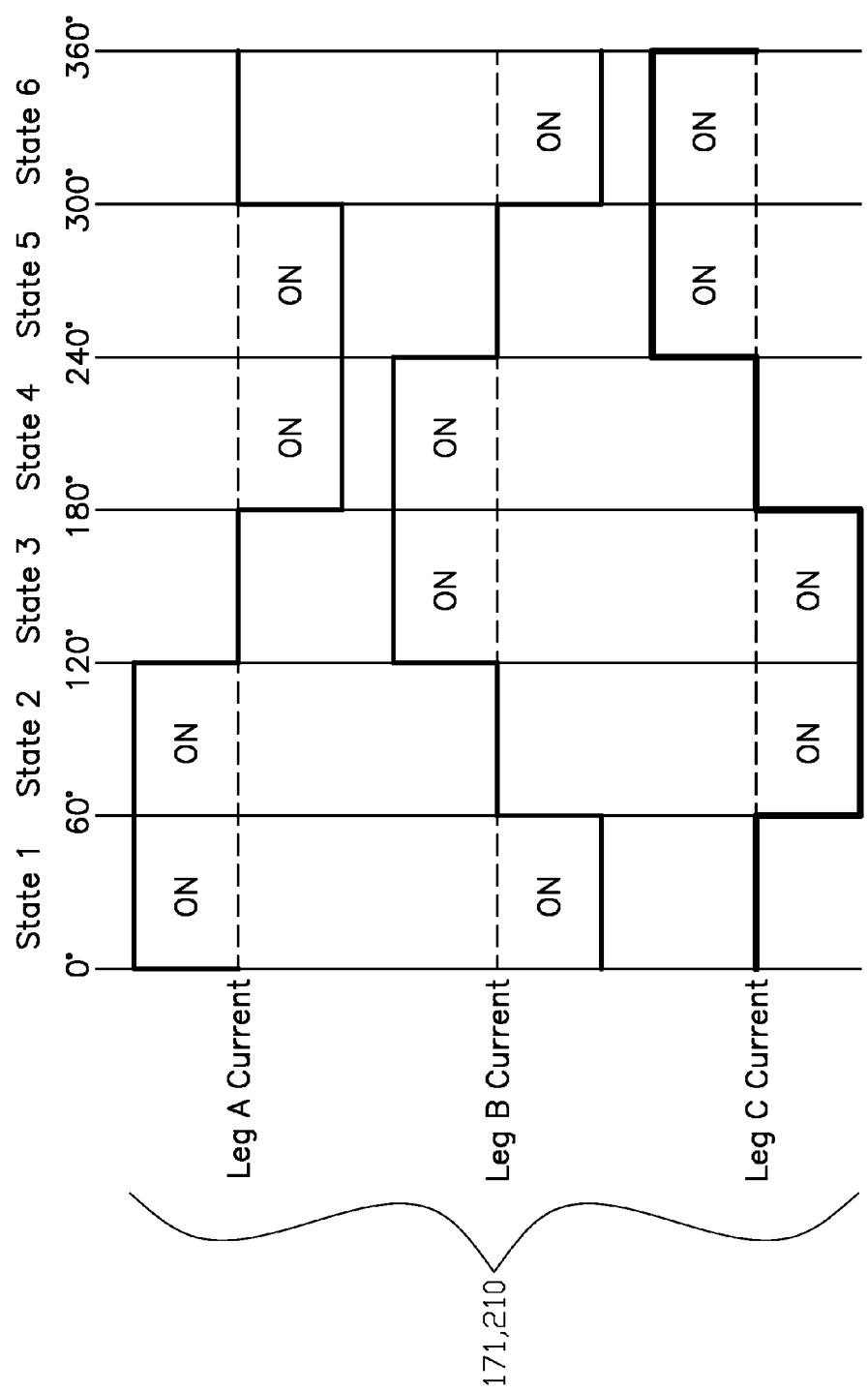
FIG. 11 shows a main bridge gate sequence with three phases through a cycle.

Next, FIG. 10 shows a main bridge gate sequence with leg A current as a single phase of the low pulse width modulation alternating current 171 for a smoothed lower harmonic wave form 210 shown through a cycle. Continuing, FIG. 11 shows a main bridge gate sequence with three phases of the low pulse width modulation alternating current 171 for a smoothed lower harmonic wave form 210 shown through a cycle.

Figure 12:
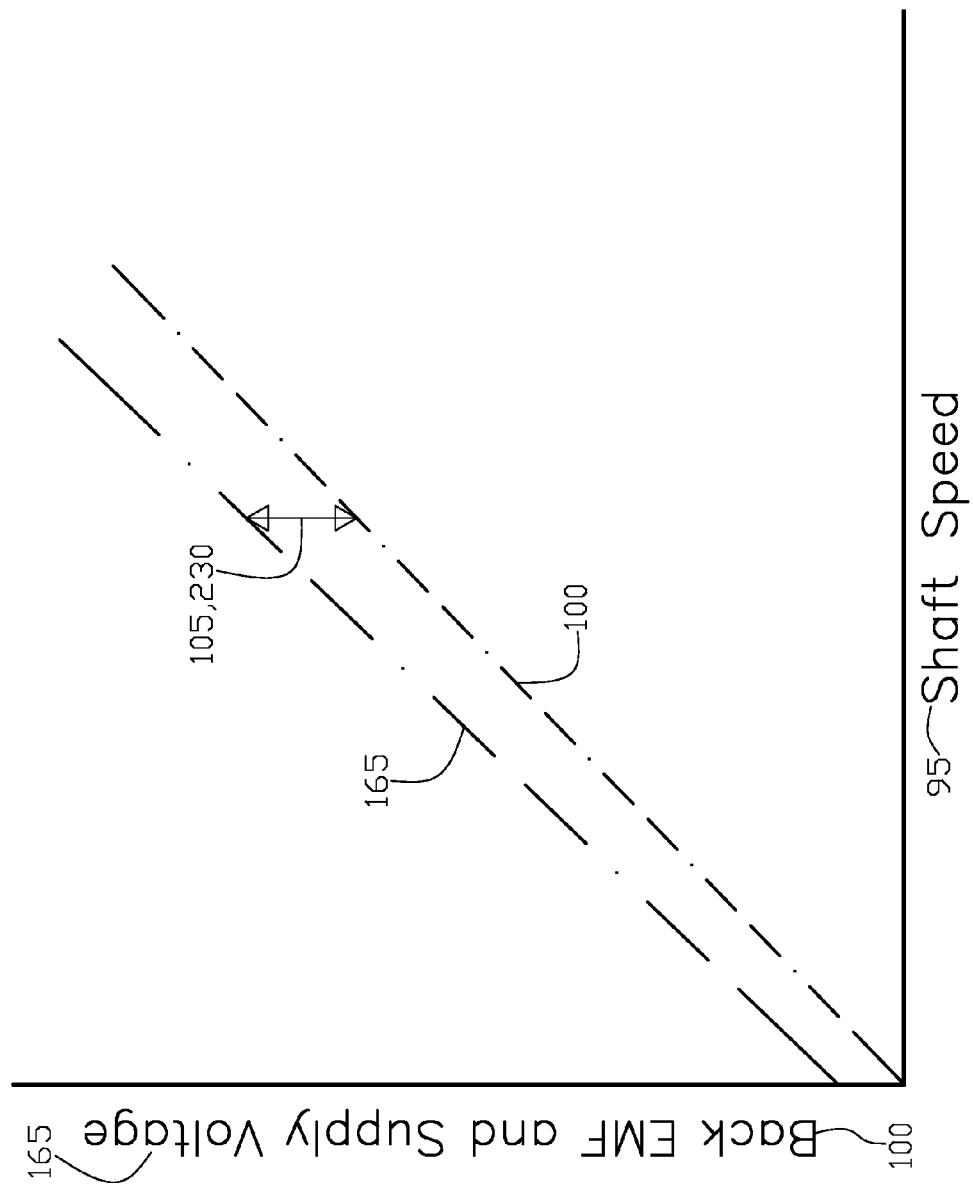
FIG. 12 shows a relative or typical idealized graph of high speed permanent magnet motor shaft rotational speed versus the back electromotive force of the motor and the controlled direct current voltage shown as a proportion above the back electromotive force being approximately equal to the sum of the voltage drops.

Further, FIG. 12 shows a relative typical or idealized graph of high speed permanent magnet motor 55 shaft rotational speed 95 versus the back electromotive force 100 of the motor 55 and the controlled direct current voltage 165 shown as a motor speed 95 proportion to make the controlled voltage 165 approximately proportionally 230 above the electromotive force 100 by the sum of the voltage drops 105 above the back electromotive force 100 being approximately equal to the sum of the voltage drops 105. Note that FIG. 12 shows the idealized linear relationships as between the high speed permanent magnet motor 55 shaft rotational speed 95 versus the back electromotive force 100 of the motor 55 and the controlled direct current voltage 165, however these aforementioned relationships could be non-linear depending upon motor 55 load types that would have a non-linear relationship with motor speed 95, such as a turbine.

Continuing, FIG. 13 shows a motor air gap 115 flux density 205 for the motor 55 at no load wherein the flux density 205 is shown as a deviation ripple effect 130 from a sine wave 190 through a frequency cycle 195 via variations in sine wave amplitude or relative air gap flux density (T) 200. Further, FIG. 14 shows the motor air gap 115 flux density 205 for the motor 55 at a fifty (50) Newton-Meter load wherein the flux density 205 is shown as an intensified deviation ripple effect 130 from a sine wave 190 through a frequency cycle 195 via undesirably increased variations in sine wave amplitude or relative air gap flux density (T) 200 as compared to FIG. 13, thus making the sine wave 190 form barely recognizable in FIG. 14. FIGS. 13 and 14 are representative of the definition of the problem to be fixed in desirably creating a smoother waveform to feed power to the motor 55 resulting in lower motor temperatures as shown in FIG. 29 from testing.

Figure 15:
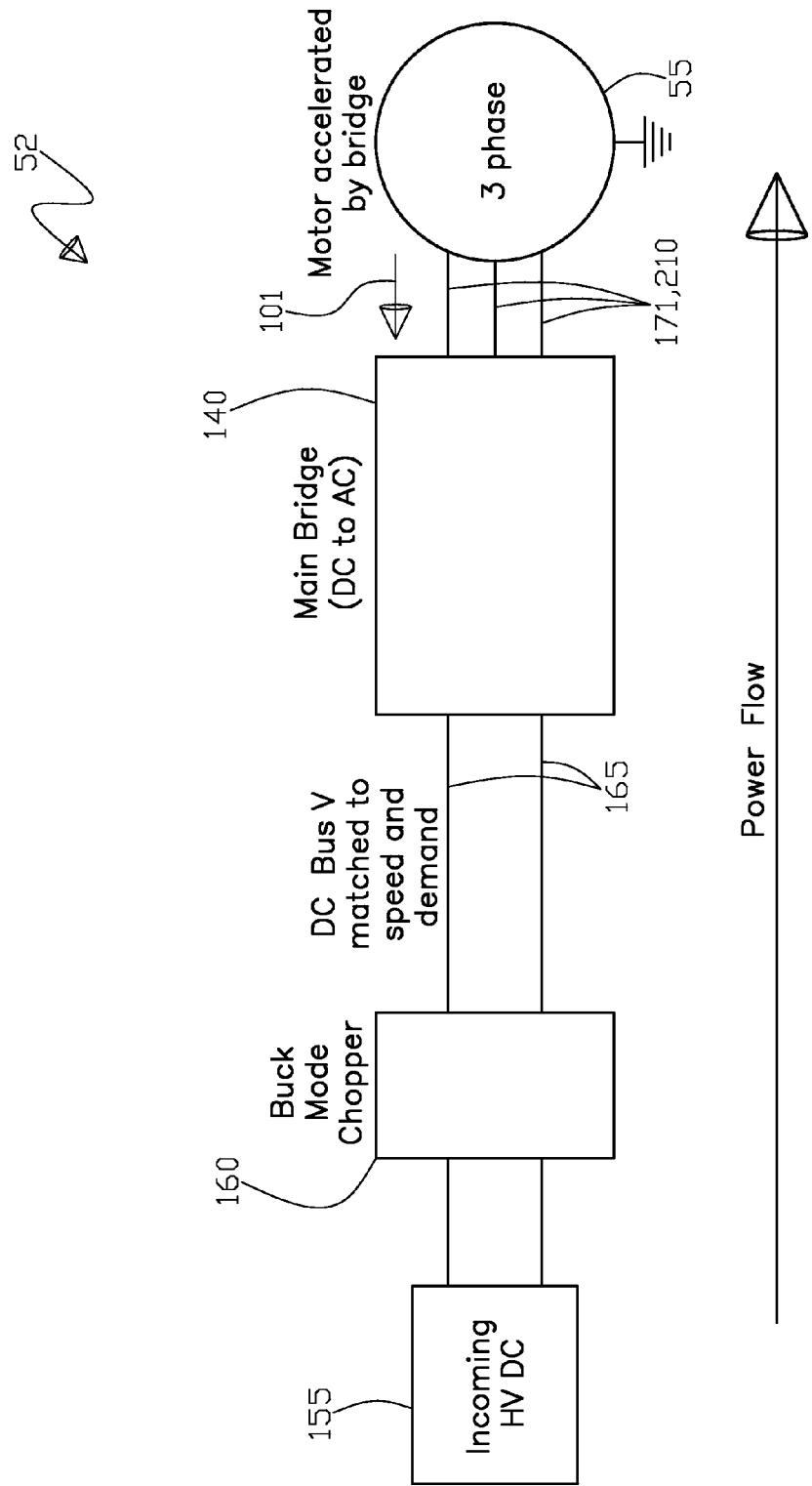
FIG. 15 shows a schematic block diagram of the second alternative embodiment for the present invention electrical control system that includes a higher voltage direct current supply system power input, a direct current to direct current converter regulator circuit, a controlled voltage direct current inverter circuit power feed, the inverter circuit assembly, a lower pulse width modulation smoothed three phase alternating current, and the high speed permanent magnet motor with a signal generated from the auxiliary stator wire loop disposed within the stator wire windings.

Further, FIG. 15 shows a schematic block diagram of the second alternative embodiment 52 for the present invention electrical control system that includes a higher voltage direct current supply system power input 155. Continuing, FIG. 15 shows a direct current to direct current converter regulator circuit 160, a controlled voltage direct current inverter circuit power feed 165, the inverter circuit assembly 140, a lower pulse width modulation smoothed three phase alternating current 171, for a smoothed lower harmonic wave form 210 (not shown), and the high speed permanent magnet motor 55 with a signal 101 generated from the auxiliary stator wire loop 106 (not shown) disposed within the stator wire windings 126 (not shown).

Figure 16:
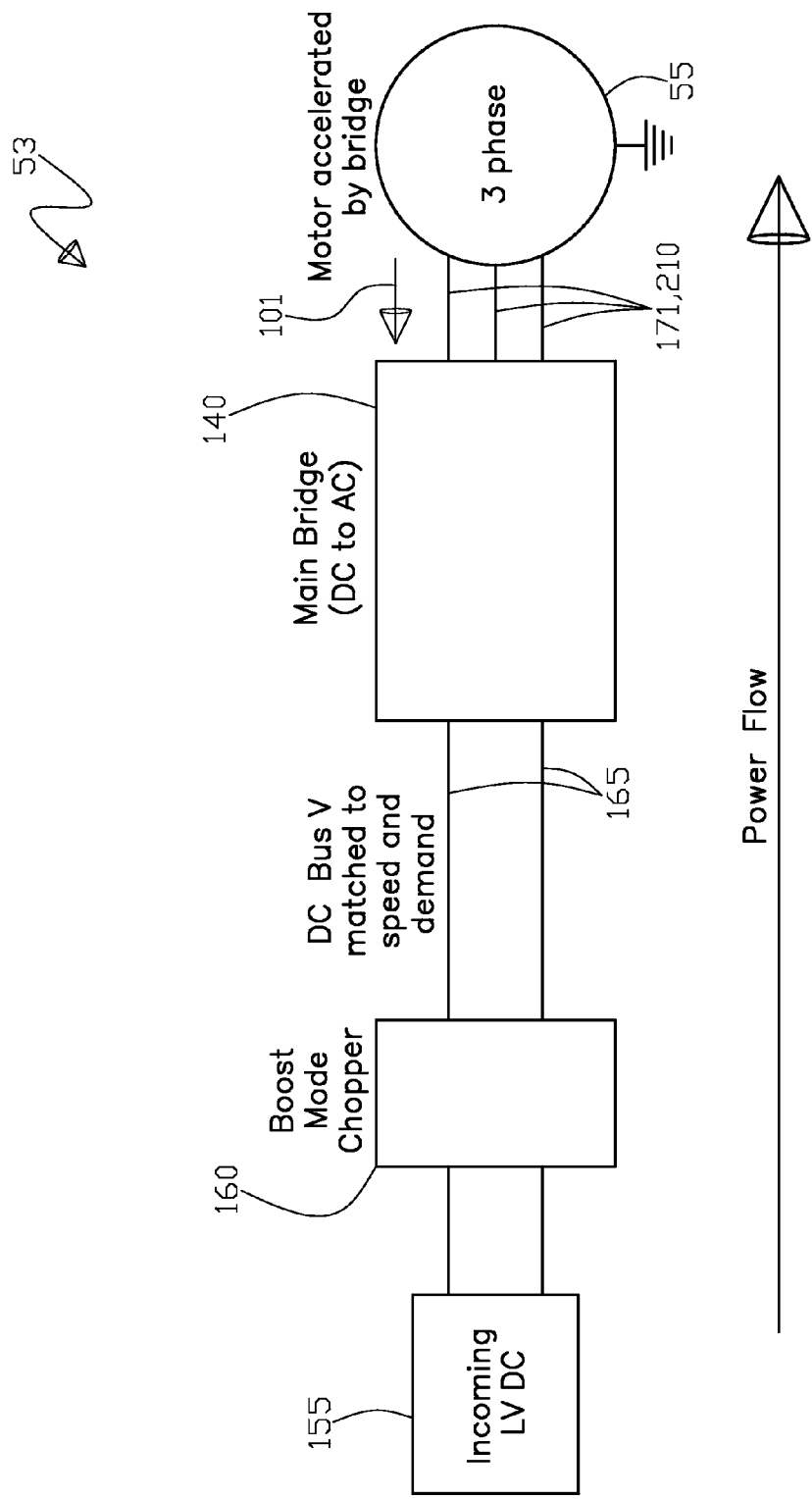
FIG. 16 shows a schematic block diagram of a third alternative embodiment of the present invention electrical control system that includes a lower voltage direct current supply system power input, a direct current to direct current converter regulator circuit, a controlled voltage direct current inverter circuit power feed, the inverter circuit assembly, a lower pulse width modulation smoothed three phase alternating current, and the high speed permanent magnet motor with a signal generated from the auxiliary stator wire loop disposed within the stator wire windings.

Next, FIG. 16 shows a schematic block diagram of a third alternative embodiment 53 of the present invention electrical control system that includes a lower voltage direct current supply system power input 155. Also, FIG. 16 shows a direct current to direct current converter regulator circuit 160, a controlled voltage direct current inverter circuit power feed 165, the inverter circuit assembly 140, a lower pulse width modulation smoothed three phase alternating current 171 for a smoothed lower harmonic wave form 210 (not shown), and the high speed permanent magnet motor 55 with a signal 101 generated from the auxiliary stator wire loop 106 (not shown) disposed within the stator wire windings 126 (not shown).

Figure 17:
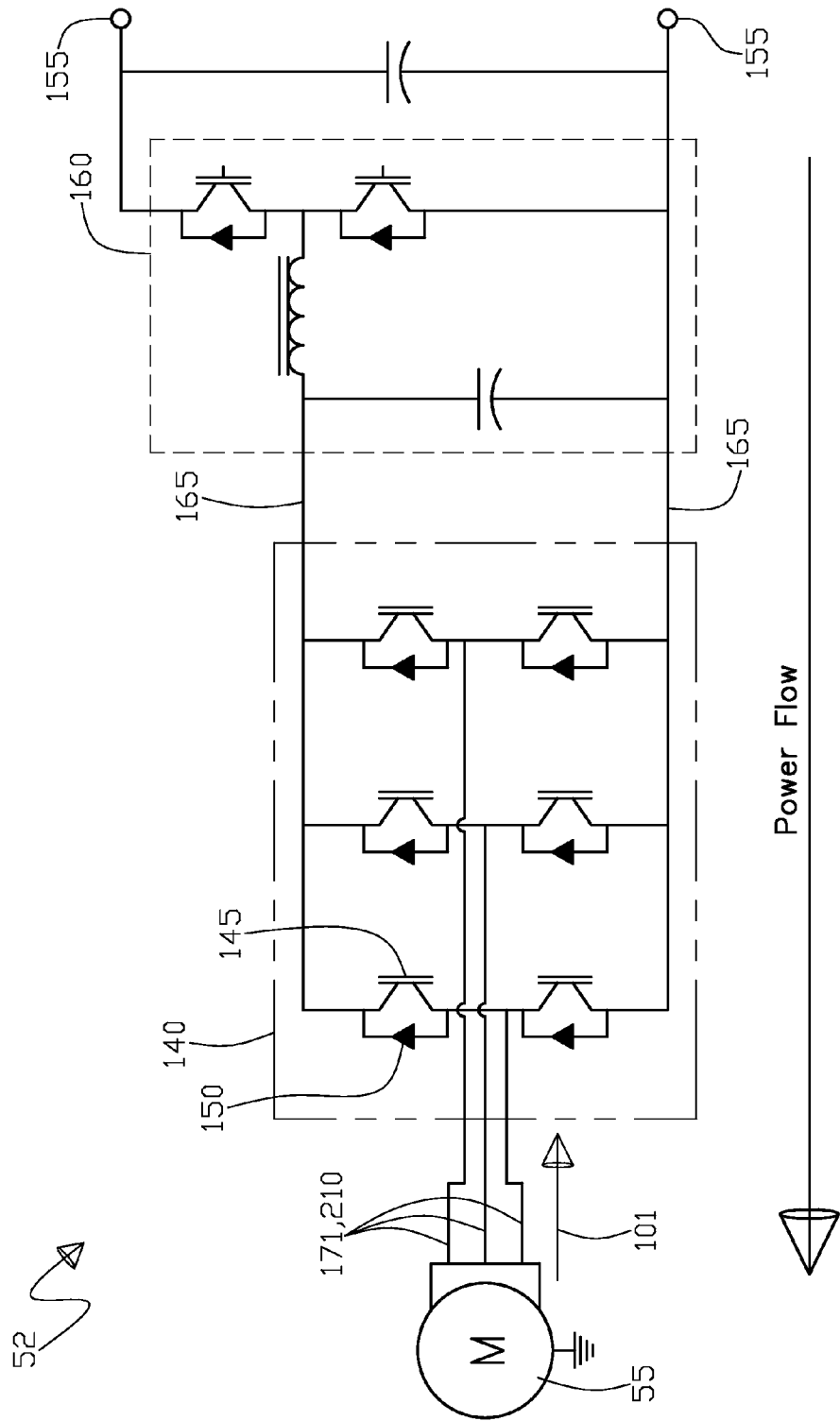
FIG. 17 shows an expanded schematic view of FIG. 15, of the second alternative embodiment for the present invention electrical control system that includes a higher voltage direct current supply system power input, a direct current to direct current converter regulator circuit, a controlled voltage direct current inverter circuit power feed, the inverter circuit assembly with inverter switches and freewheeling diodes, a lower pulse width modulation smoothed three phase alternating current, and the high speed permanent magnet motor with a signal generated from the auxiliary stator wire loop disposed within the stator wire windings.

Continuing, FIG. 17 shows an expanded schematic view of FIG. 15, of the second alternative embodiment 52 for the present invention electrical control system that includes a higher voltage direct current supply system power input 155. Further, FIG. 17 shows a direct current to direct current converter regulator circuit 160, a controlled voltage direct current inverter circuit power feed 165, the inverter circuit assembly 140 with inverter switches 145 and freewheeling diodes 150, a lower pulse width modulation smoothed three phase alternating current 171 for a smoothed lower harmonic wave form 210, and the high speed permanent magnet motor 55 with a signal 101 generated from the auxiliary stator wire loop 106 (not shown) disposed within the stator wire windings 126 (not shown).

Figure 18:
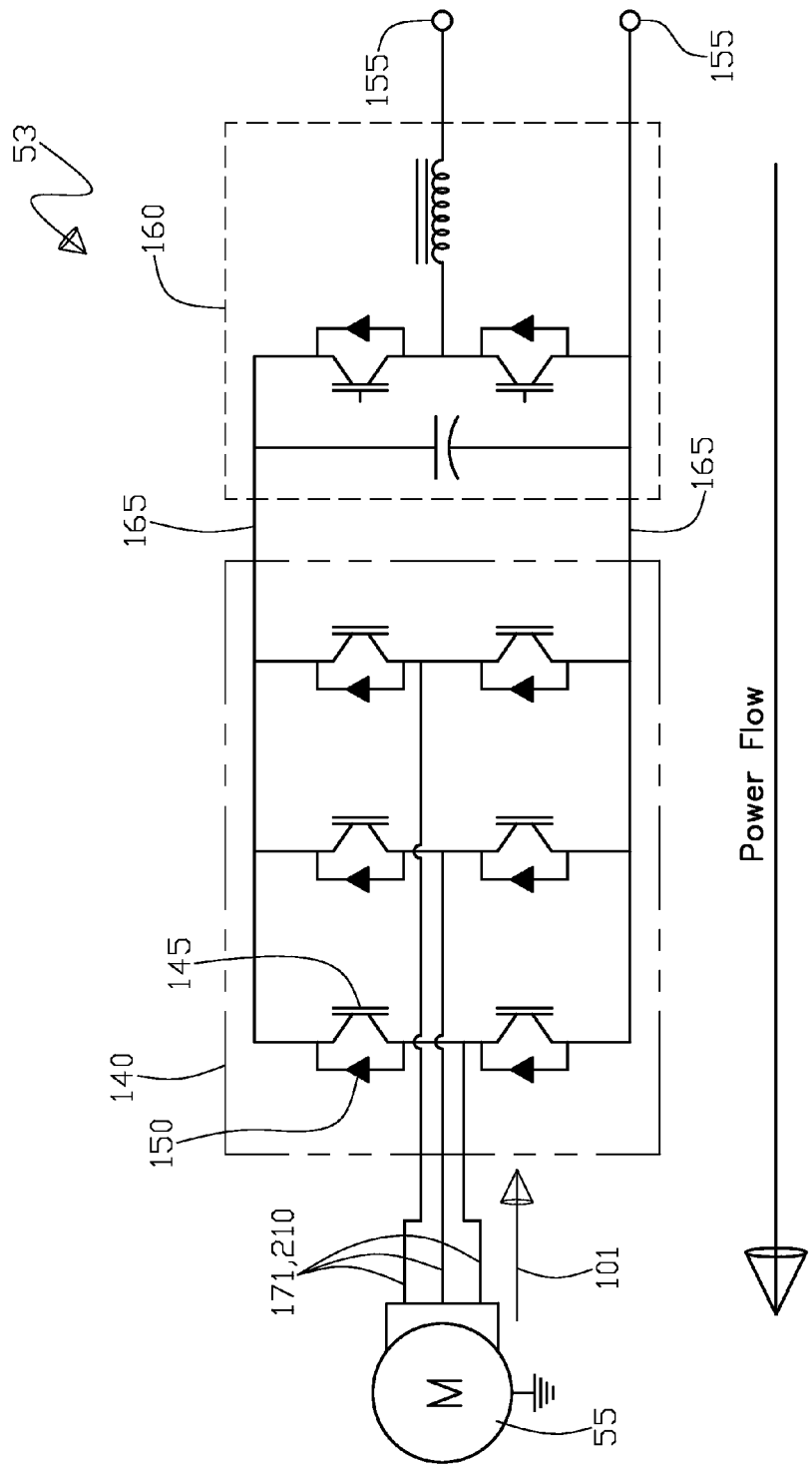
FIG. 18 shows an expanded schematic view of FIG. 16, of the third alternative embodiment of the present invention electrical control system that includes a lower voltage direct current supply system power input, a direct current to direct current converter regulator circuit, a controlled voltage direct current inverter circuit power feed, the inverter circuit assembly with inverter switches and freewheeling diodes, a lower pulse width modulation smoothed three phase alternating current, and the high speed permanent magnet motor with a signal generated from the auxiliary stator wire loop disposed within the stator wire windings.

Yet further, FIG. 18 shows an expanded schematic view of FIG. 16, of the third alternative embodiment 53 of the present invention electrical control system that includes a lower voltage direct current supply system power input 155. Also, FIG. 18 shows a direct current to direct current converter regulator circuit 160, a controlled voltage direct current inverter circuit power feed 165, the inverter circuit assembly 140 with inverter switches 145 and freewheeling diodes 150, a lower pulse width modulation smoothed three phase alternating current 171 for a smoothed lower harmonic wave form 210, and the high speed permanent magnet motor 55 with a signal 101 generated from the auxiliary stator wire loop 106 (not shown) disposed within the stator wire windings 126 (not shown).

Figure 19:
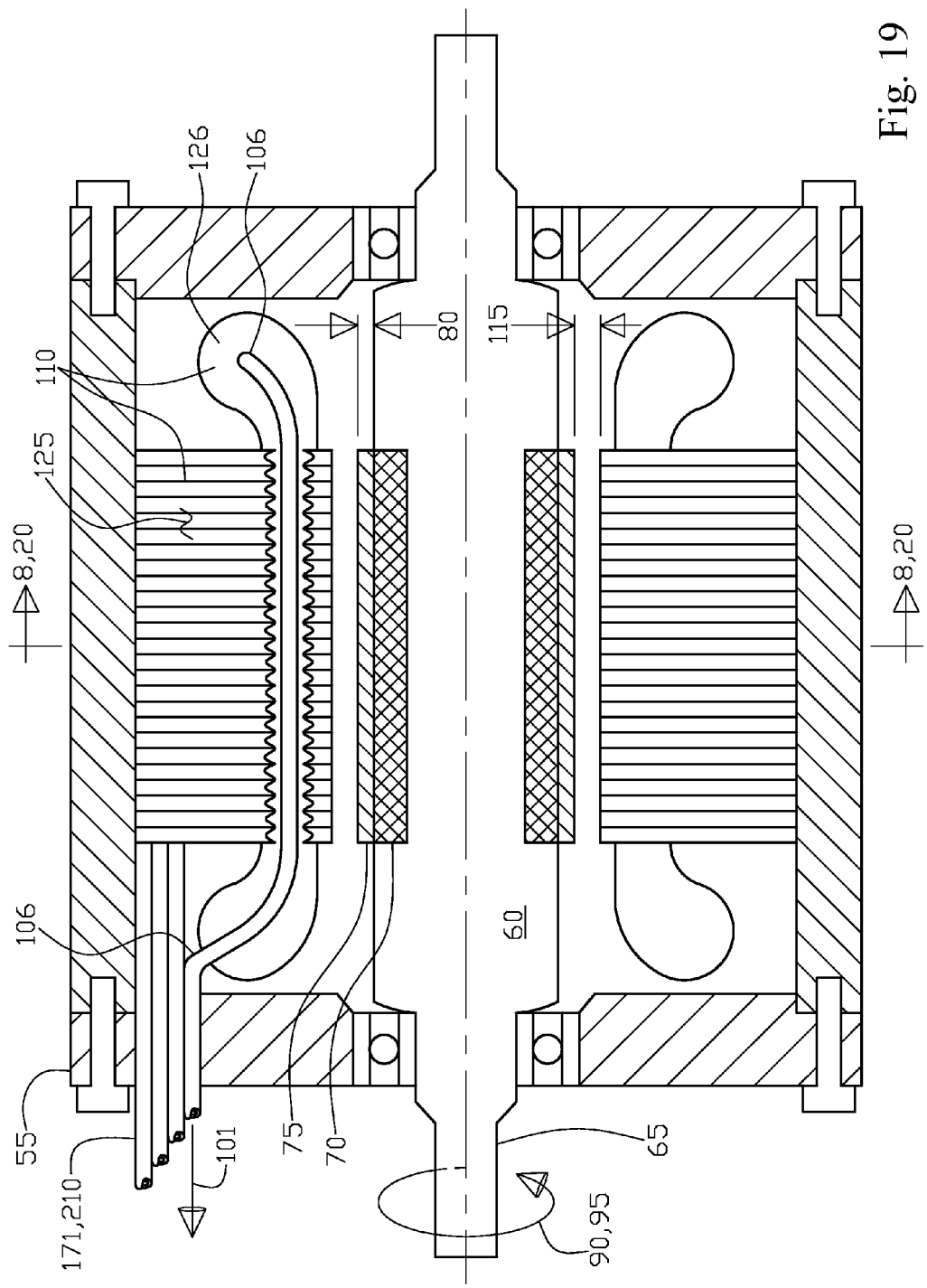
FIG. 19 shows a cross section of the high speed permanent magnet motor including a rotor with a shaft, shaft rotation and speed, a permanent magnet, a structural reinforcement sleeve, a sleeve thickness, further a stator including a core, windings, also an air gap, with the three phase lower pulse width modulation alternating current motor power feed in addition to the signal generated from the auxiliary stator wire loop disposed within the stator wire windings.

Next, FIG. 19 shows a cross section of the high speed permanent magnet motor 55 including a rotor 60 with a shaft 65, shaft rotation 90 and speed 95, a permanent magnet 70, a structural reinforcement sleeve 75, a sleeve thickness 80, further a stator 110 including a core 125, windings 126, also an air gap 115, with the three phase lower pulse width modulation alternating current motor power feed 171 for a smoothed lower harmonic wave form 210 in addition to the added option of the signal 101 that is generated from the added option of the auxiliary stator wire loop 106 being disposed within the stator wire windings 126.

Figure 20:
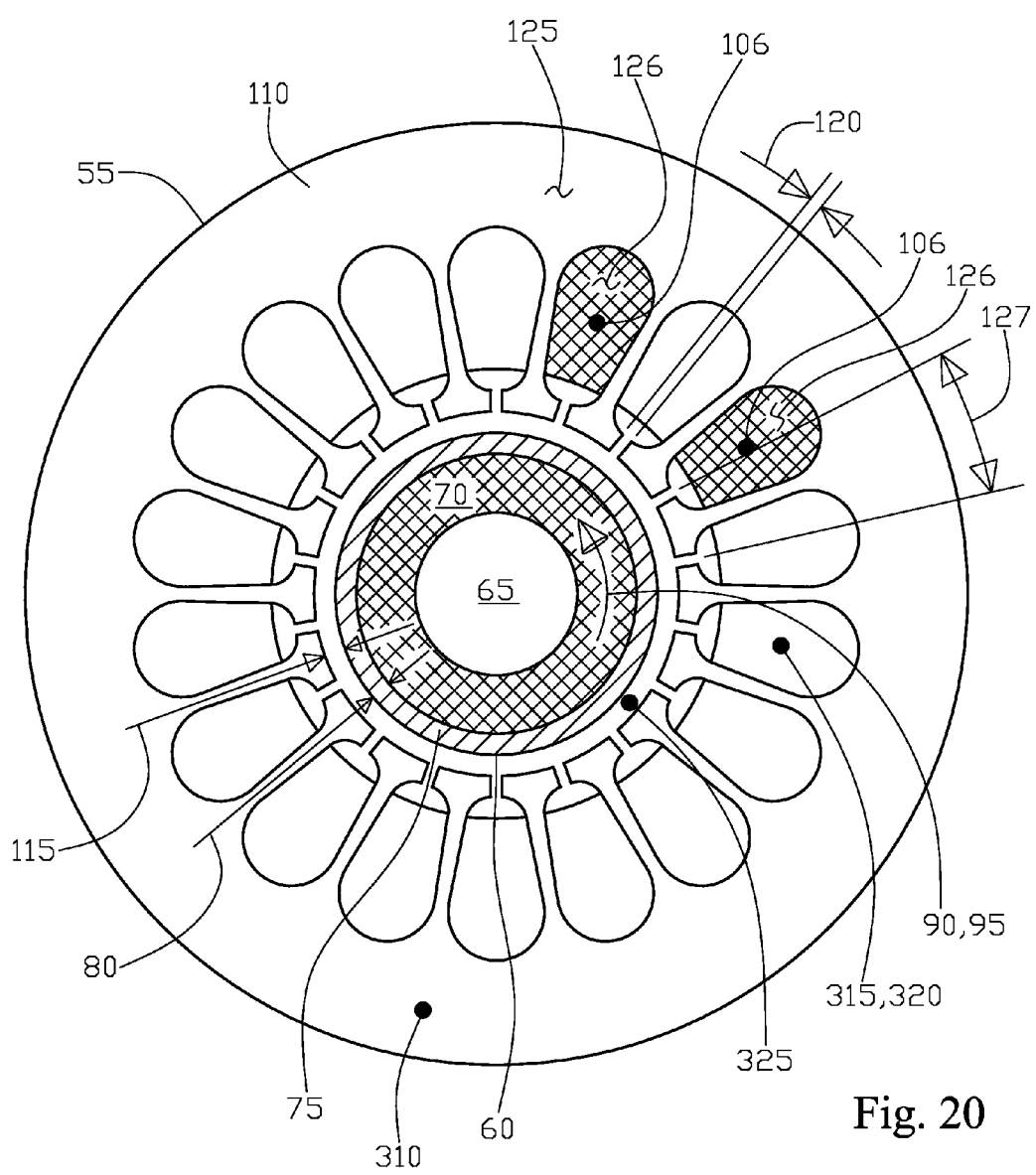
FIG. 20 shows cross section cut 20-20 from FIG. 19 showing the high speed permanent magnet motor including the rotor with the shaft, the shaft rotation and speed, the permanent magnet, the structural reinforcement sleeve, the sleeve thickness, further a stator including the core, the windings, the auxiliary stator wire loop, the air gap, a slot gap, and a slot pitch.

Continuing, FIG. 20 shows cross section cut 20-20 from FIG. 19 showing the high speed permanent magnet motor 55 including the rotor 60 with the shaft 65, the shaft rotation 90 and speed 95, the permanent magnet 70, the structural reinforcement sleeve 75, the sleeve thickness 80, further a stator 110 including the core 125, the windings 126, with the added optional auxiliary stator wire loop 106, the air gap 115, a slot gap 120, and a slot pitch 127.

Figure 21:
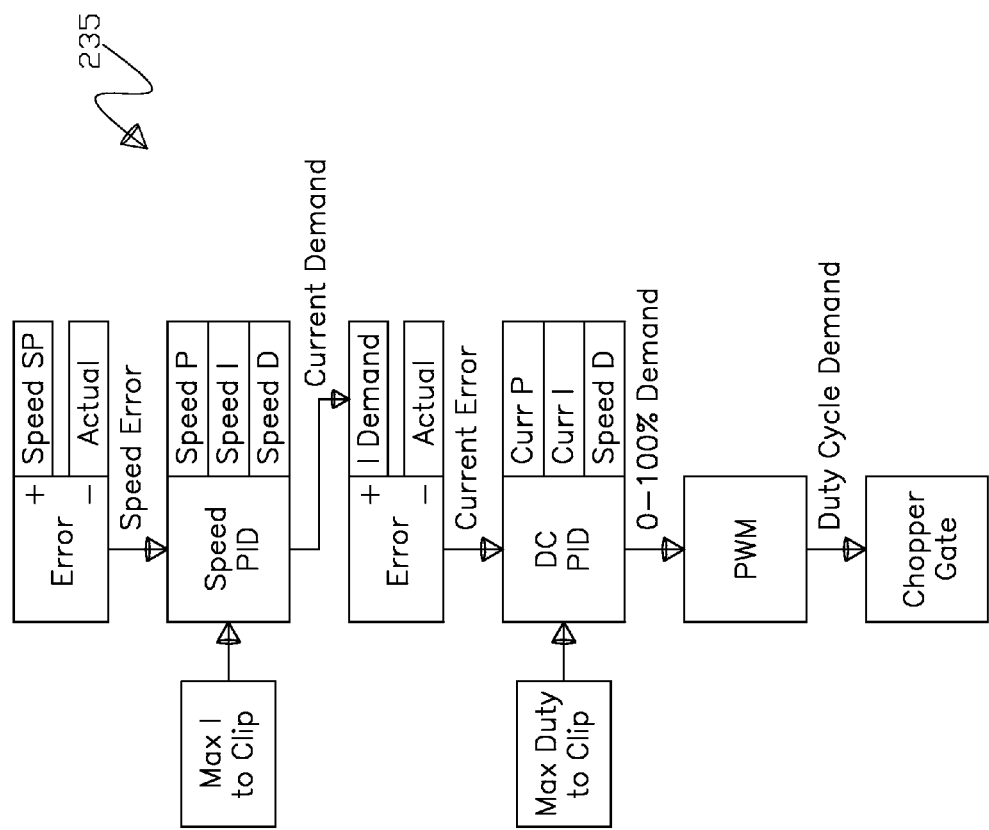
FIG. 21 shows a summary control diagram of motor logic with a means for regulating the controlled voltage direct current inverter circuit power feed showing a control loop feedback mechanism or proportional integral derivative control for motor rotational speed as determined from the signal generated from the auxiliary stator wire loop to determine the controlled voltage feed to the inverter, note that FIGS. 9 and 21 could be combined for a hybrid functionality.
Figure 23:
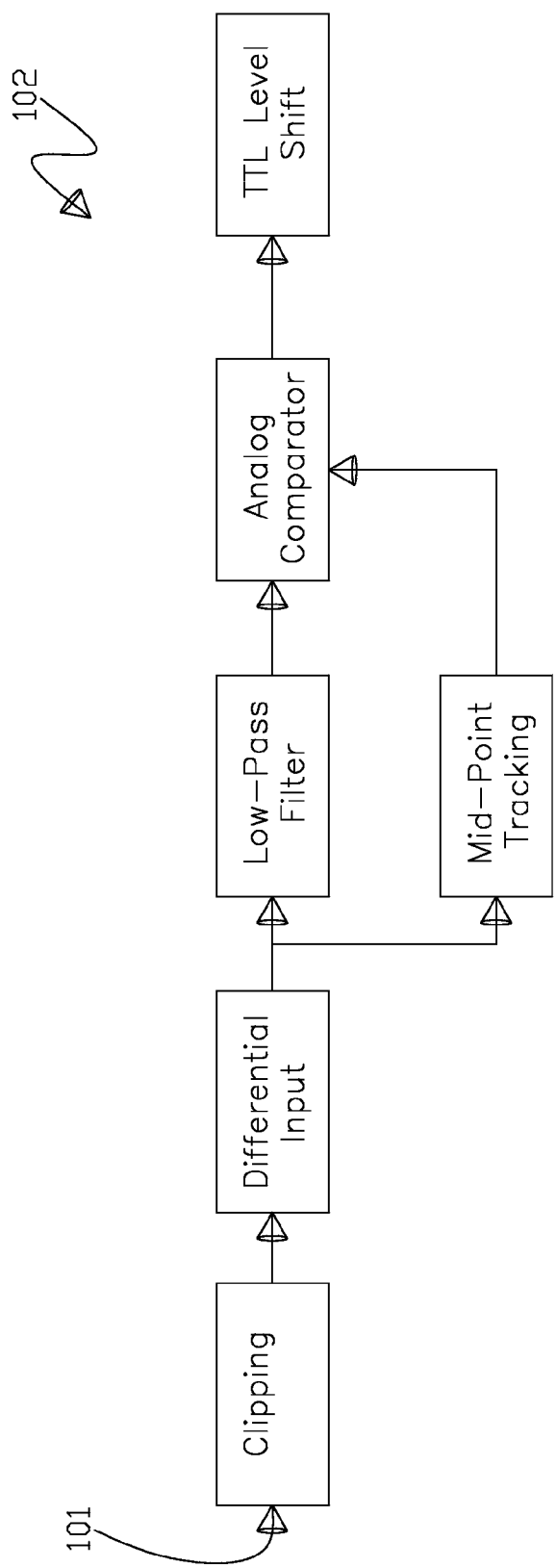
FIG. 23 shows a summary block diagram for signal processing from the auxiliary stator wire loop to the means for regulating the controlled voltage direct current inverter circuit power feed shown in FIG. 21.

Further, FIG. 21 shows a summary control diagram of motor 55 logic with a means 235 for regulating the controlled voltage direct current inverter circuit power feed 165 showing a control loop feedback mechanism or proportional integral derivative control termed PID for motor rotational speed 95 and motor 55 rotor 60 rotational position as determined from the signal 101 generated from the auxiliary stator wire loop 106 with the signal 101 processed by circuitry 102 as shown in FIG. 23, to determine the controlled voltage feed 165 to the inverter 140. Note that FIGS. 9 and 21 could be combined to form a hybrid motor 55 rotational speed 95 sensorless indication and motor 55 rotor 60 rotational position sensorless indication. The alternative combining of FIGS. 9 and 21 would involve the use of the back electromotive force 100 to make the controlled voltage 165 approximately proportionally 230 above the electromotive force 100 by the sum of the voltage drops 105 via pulse width modulation to the back electromotive force 100 for the controlled voltage feed 165 to the inverter 140 and the signal 101 generated from the auxiliary stator wire loop 106 with the signal 101 processed by circuitry 102 for motor rotational speed 95 and motor 55 rotor 60 rotational position. In addition, for FIG. 21, the control loop feedback mechanism or PID could also be integral derivative (ID) without the P or proportional integral (PI) without the D.

Figure 22:
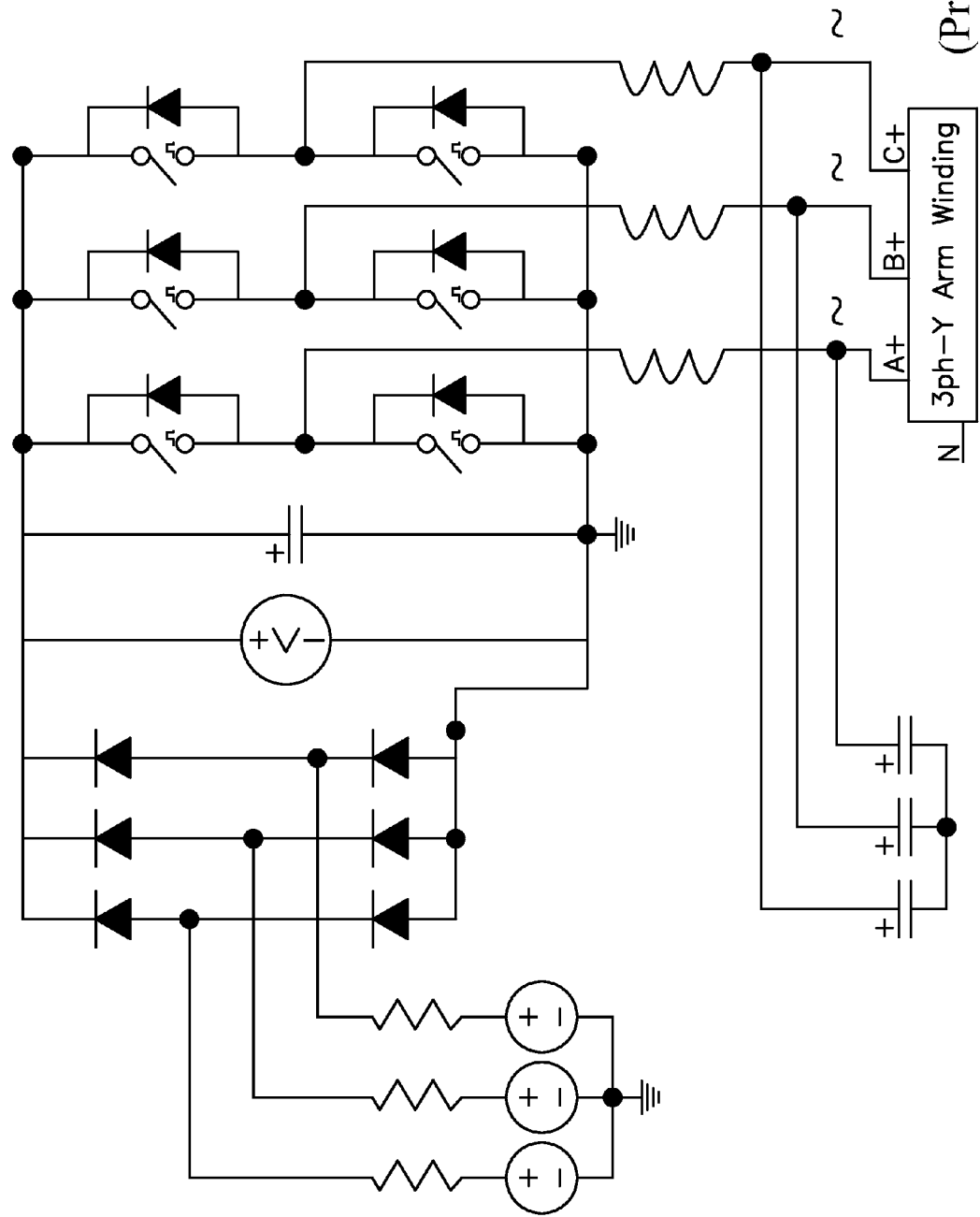
FIG. 22 shows a schematic diagram of a specific prior art SPINDEL brand power system that includes a high speed permanent magnet motor, a three phase alternating current, and an inverter circuit assembly with a direct current supply system power input.

Continuing, FIG. 22 shows a schematic diagram of a specific prior art SPINDEL brand power system that includes a high speed permanent magnet motor, a three phase alternating current, and an inverter circuit assembly with a direct current supply system power input. Next, FIG. 23 shows a summary block diagram 102 for signal 101 processing from the auxiliary stator wire loop 106 to the means 235 for regulating the controlled voltage direct current inverter circuit power feed shown in FIG. 21. Combining the summary block diagram 102 and means 235 in FIG. 21 comprises the wire loop system 107 for converting signal 101 from the wire loop 106 in to rotor 60 speed 95 and rotor 60 rotational position to the stator 110 to determine the controlled voltage 165 for increased motor efficiency, regulator efficiency, and electromagnetic compatibility for reduced filtering, further shown in going from FIGS. 14 to 13, or in the comparison of wave forms between FIGS. 26, 27, and 28, also as indicated in FIG. 29 with reduced motor temperatures 310, 315, 320, and 325 for the "voltage match" row.

Figure 24:
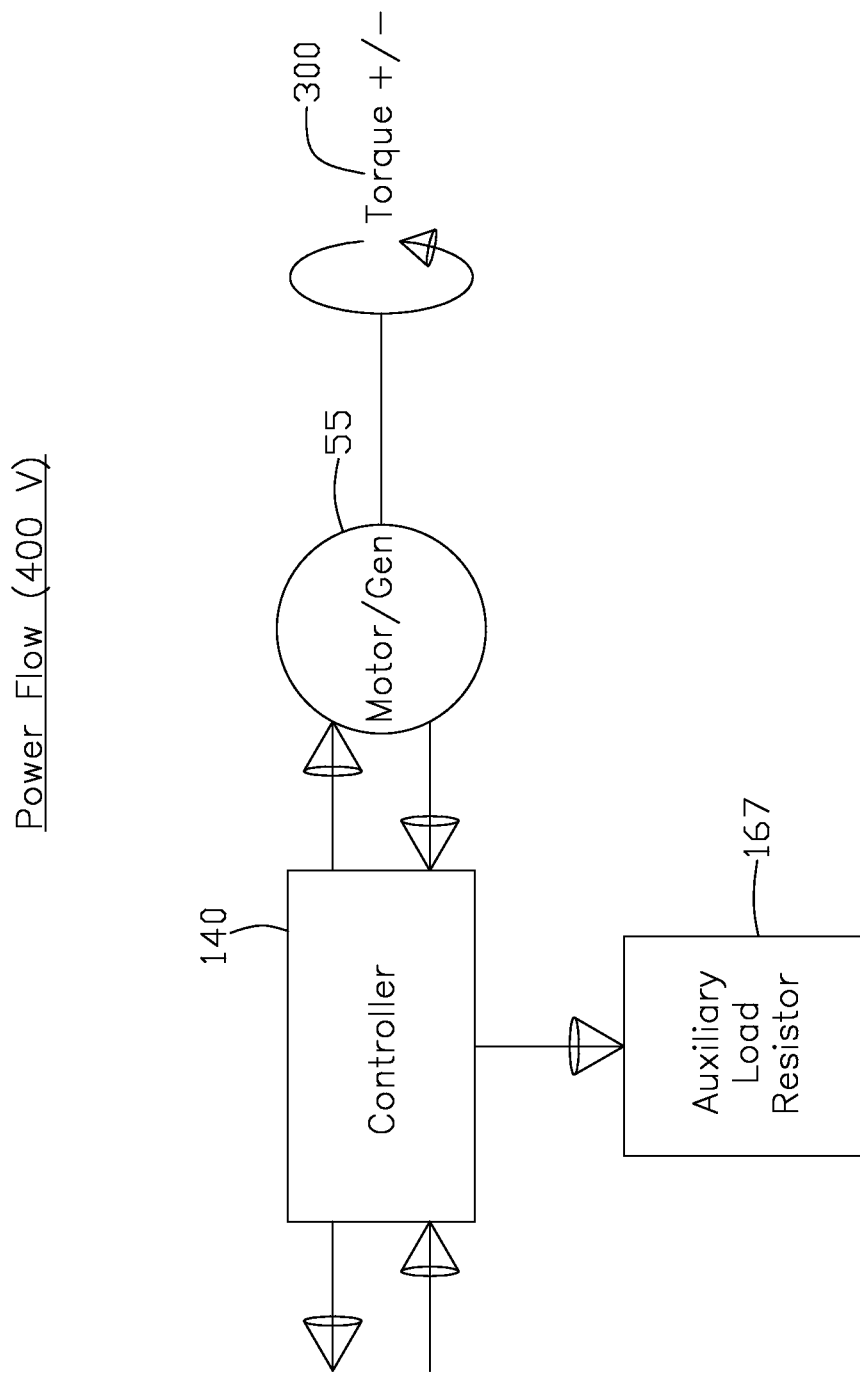
FIG. 24 shows a summary block diagram of the power flow with the torque load that can either be positive (driving the motor to be a generator) or negative to consume power from the motor, the motor (generator), the controller, and the auxiliary load resistor.
Figure 25:
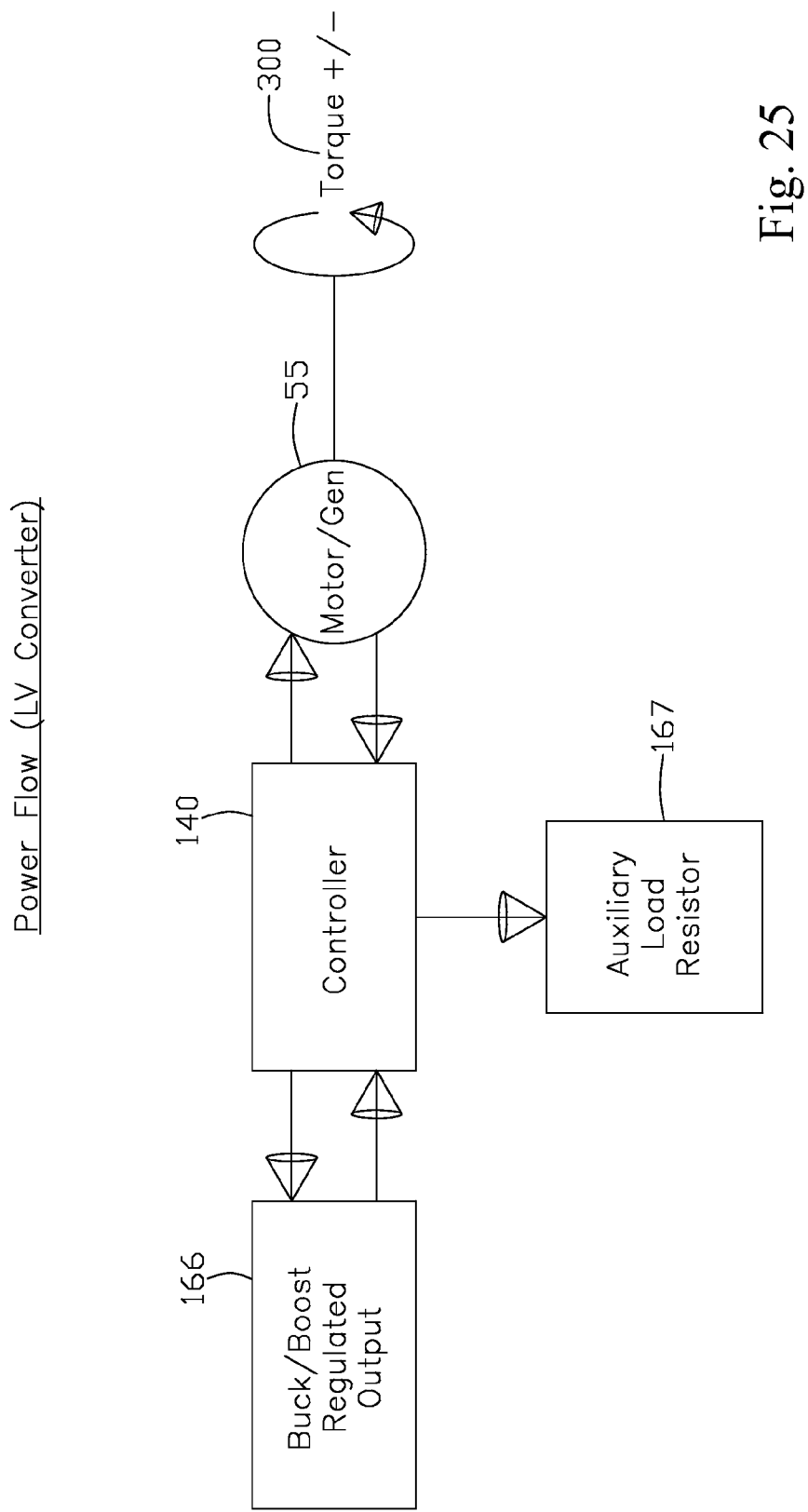
FIG. 25 shows a summary block diagram of the low voltage (LV) converter with the with the torque load that can either be positive (driving the motor to be a generator) or negative to consume power from the motor, the motor (generator), the controller, and the auxiliary load resistor, and the buck/boost regulator.

Further, FIG. 24 shows a summary block diagram of the four hundred volt (400 V) power flow with the torque load 300 that can either be positive (driving the motor 55 to be a generator) or negative to consume power from the motor 55, the motor 55 (generator), the controller 140, and the auxiliary load resistor 167. Next, FIG. 25 shows a summary block diagram of the low voltage (LV) converter with the with the torque load 300 that can either be positive (driving the motor 55 to be a generator) or negative to consume power from the motor 55, the motor 55 (generator), the controller 140, the auxiliary load resistor 167, and the buck/boost regulator 166.

Figure 26:
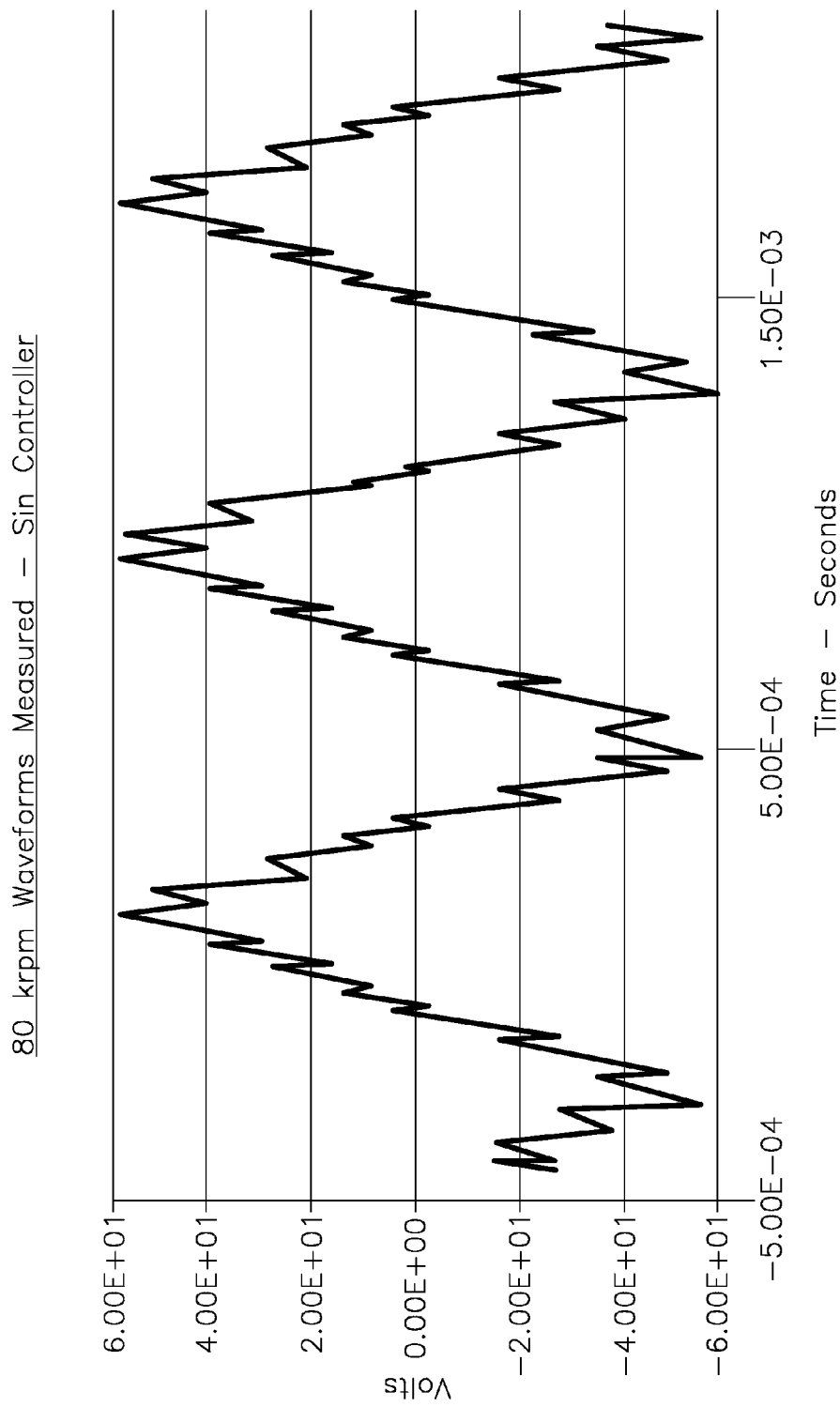
FIG. 26 shows a waveform from the specific prior art SPINDEL brand controller as schematically shown in FIG. 22, wherein the FIG. 26 waveform motor power feed has a high RMS ripple at eighty-thousand (80K) rpm with volts as the Y axis versus time in seconds as the X axis.

Next, FIG. 26 shows a waveform from the specific prior art SPINDEL brand controller as schematically shown in FIG. 22, wherein the FIG. 26 waveform has a high RMS ripple at eighty-thousand (80K) rpm 95 as a motor 55 (not shown) power feed, with volts as the Y axis versus time in seconds as the X axis.

Figure 27:
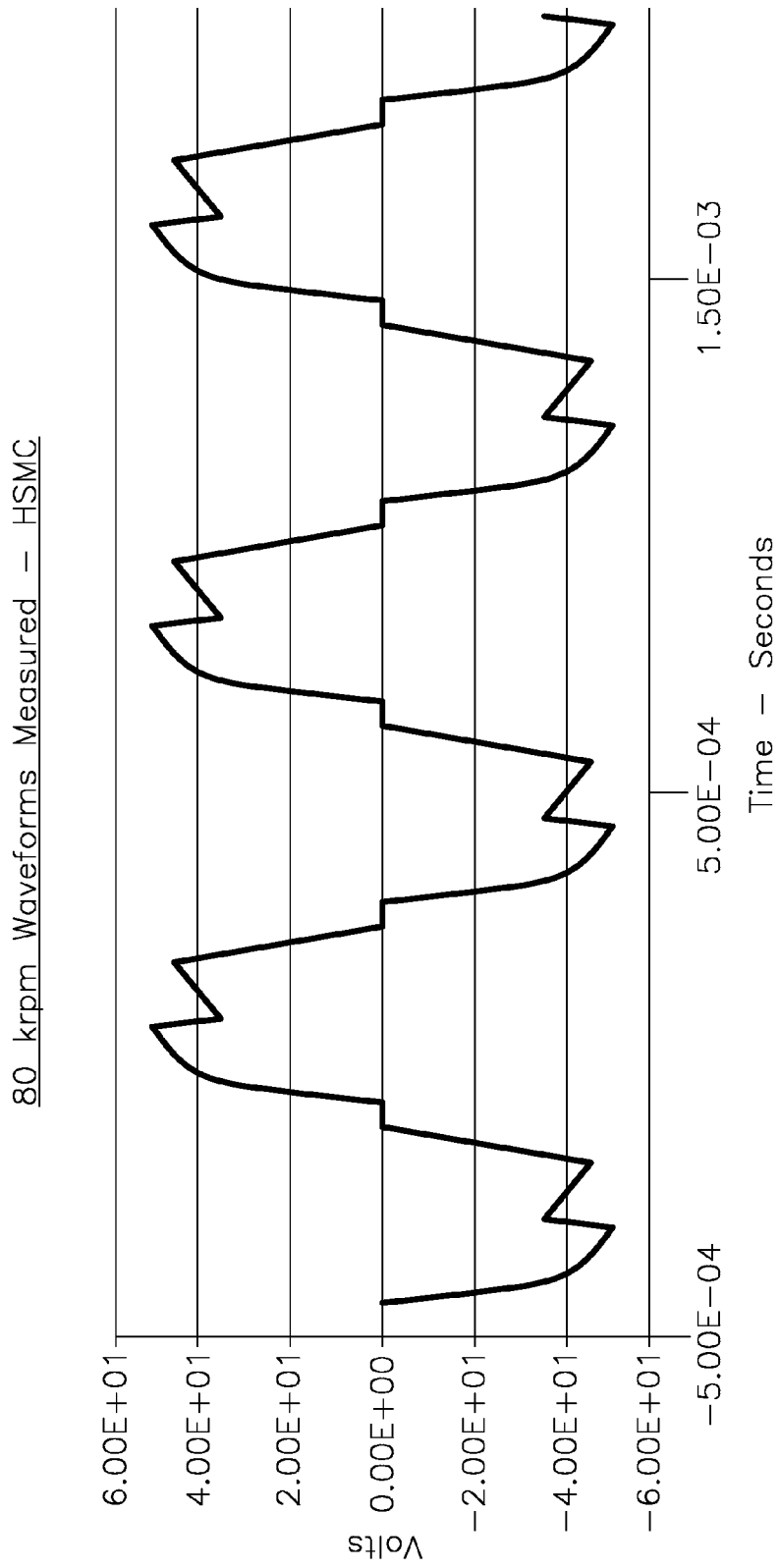
FIG. 27 shows the present invention controller having a smoother waveform as the motor power feed at eighty-thousand (80K) rpm, with volts as the Y axis versus time in seconds as the X axis.
Figure 28:
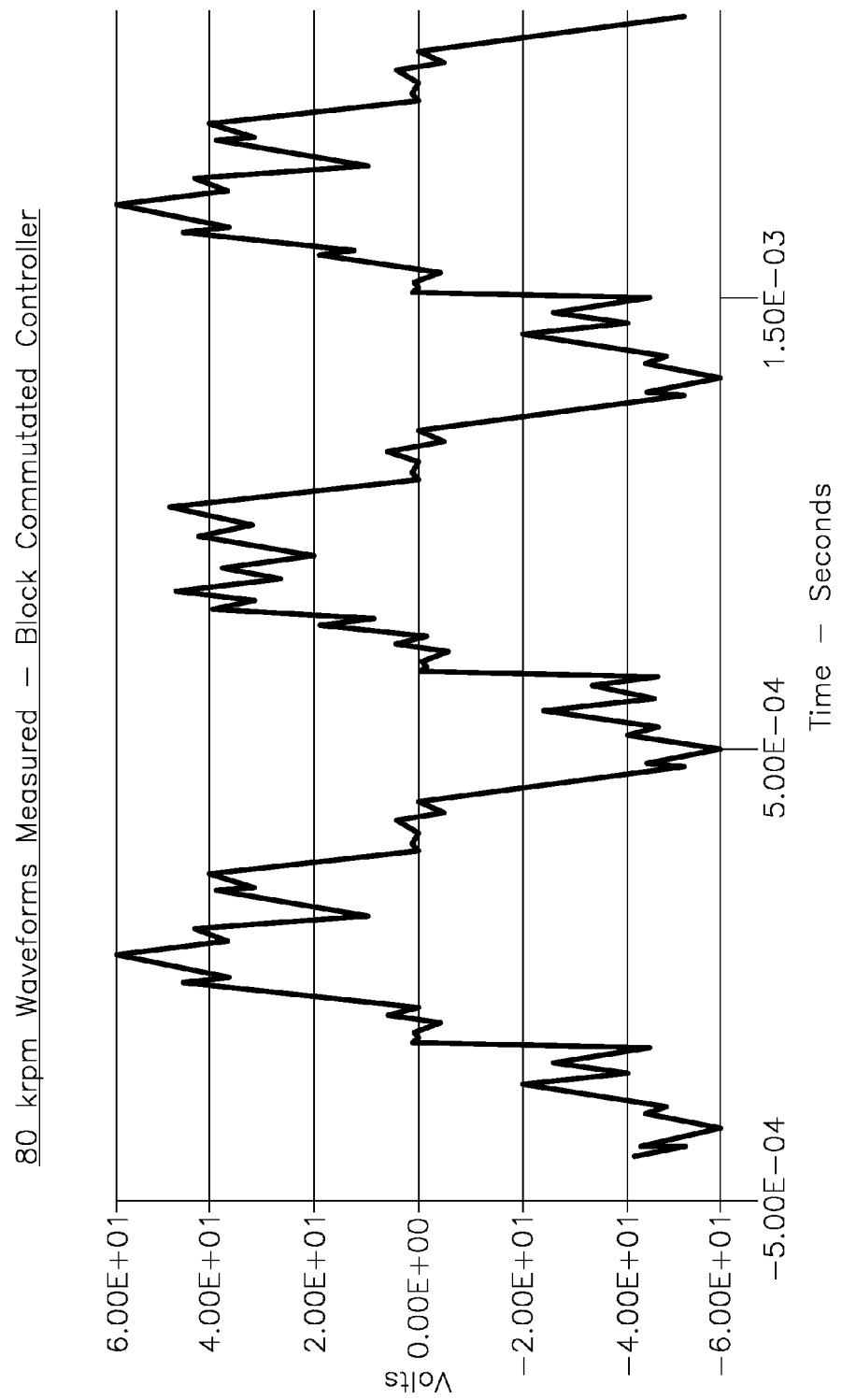
FIG. 28 shows a typical block commutated controller having a high RMS ripple waveform as the motor power feed at eighty-thousand (80K) rpm, with volts as the Y axis versus time in seconds as the X axis.

Further, FIG. 27 shows the present invention controller 50, 51, 52, or 53 smoother waveform as the motor 55 power feed at eighty-thousand (80K) rpm, with volts as the Y axis versus time in seconds as the X axis. Continuing, FIG. 28 shows a block commutated controller having a high RMS ripple waveform as the motor 55 power feed at eighty-thousand (80K) rpm, with volts as the Y axis versus time in seconds as the X axis.

Next, FIG. 29 shows a test data table showing the reduction in motor 55 temperatures 310, 315, 320, and 325 as shown positioned in FIG. 20, resulting from matched voltage from the present invention electrical control system 50, 51, 52, or 53 using means 225, 235 voltage regulator culminating from the smoothed lower harmonic waveform feed to the motor 55.

Figure 30:
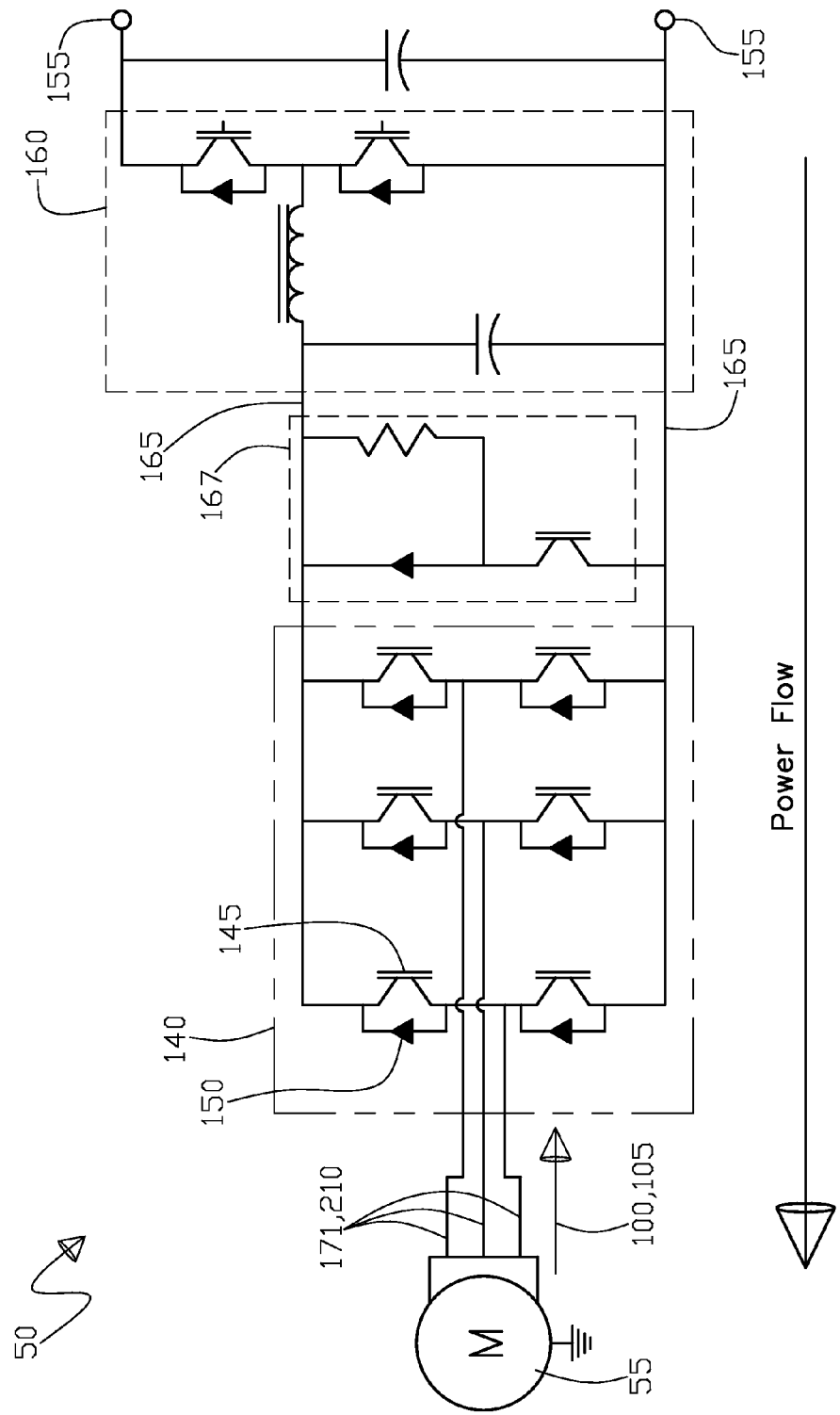
FIG. 30 shows an expanded schematic view of FIGS. 2 and 4, of the present invention electrical control system that includes a higher voltage direct current supply system power input, a direct current to direct current converter regulator circuit, a controlled voltage direct current inverter circuit power feed, the inverter circuit assembly with inverter switches and freewheeling diodes, a lower pulse width modulation smoothed three phase alternating current, and the high speed permanent magnet motor with back electromotive force and voltage drops shown, and further with the addition of the auxiliary load circuit.

Continuing, FIG. 30 shows an expanded schematic view of FIGS. 2 and 4, of the present invention electrical control system 50 that includes a higher voltage direct current supply system power input 155, a direct current to direct current converter regulator circuit 160, a controlled voltage direct current inverter circuit power feed 165, the inverter circuit assembly 140 with inverter switches 145 and freewheeling diodes 150, a lower pulse width modulation smoothed three phase alternating current 171 for a smoothed lower harmonic wave form 210, and the high speed permanent magnet motor 55 with back electromotive force 100 and voltage drops 105 shown, and further with the addition of the auxiliary load circuit 167.

Figure 31:
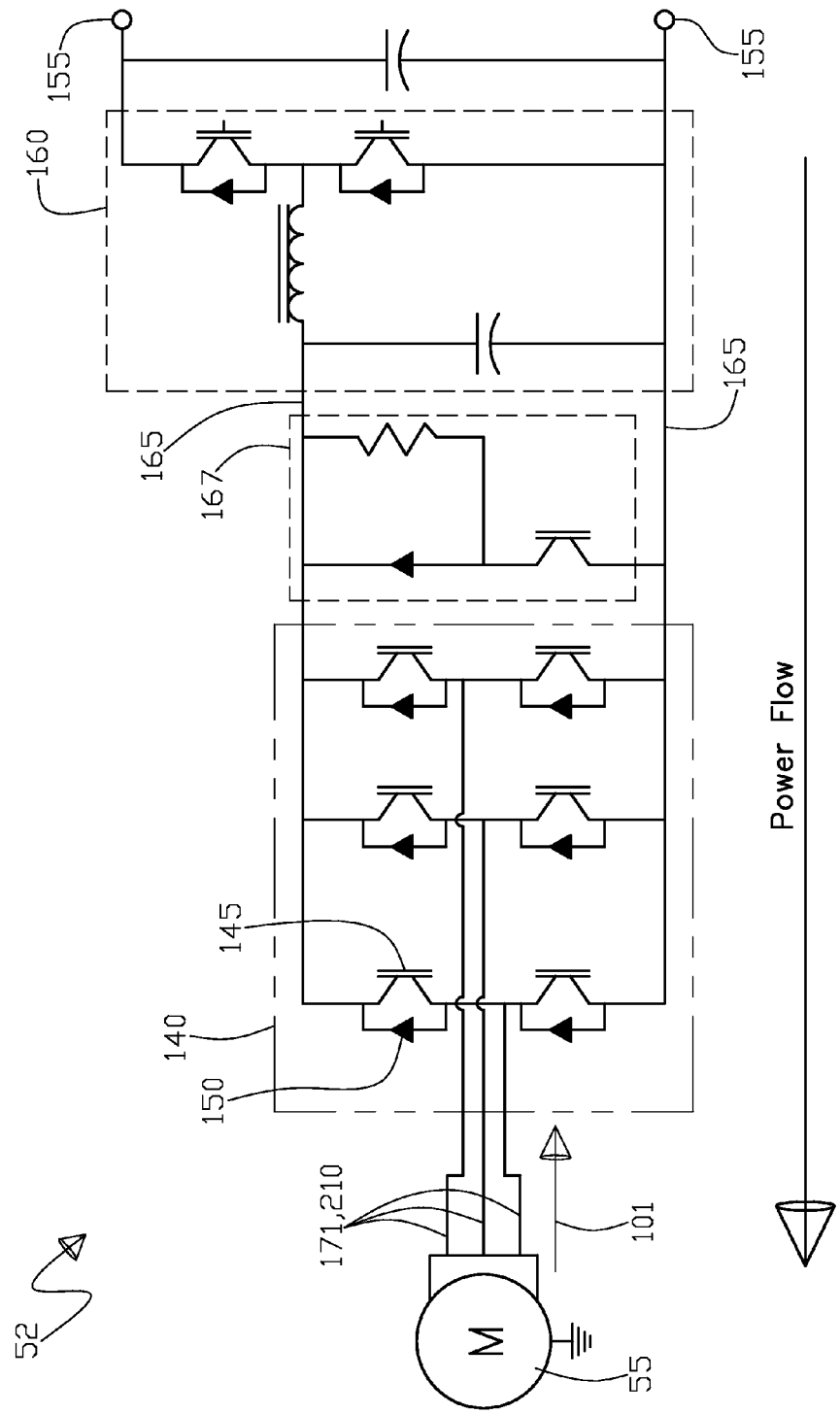
FIG. 31 shows an expanded schematic view of FIGS. 15 and 17, of the second alternative embodiment for the present invention electrical control system that includes a higher voltage direct current supply system power input, a direct current to direct current converter regulator circuit, a controlled voltage direct current inverter circuit power feed, the inverter circuit assembly with inverter switches and freewheeling diodes, a lower pulse width modulation smoothed three phase alternating current, and the high speed permanent magnet motor with a signal generated from the auxiliary stator wire loop disposed within the stator wire windings, and further with the addition of the auxiliary load circuit.

Further, FIG. 31 shows an expanded schematic view of FIGS. 15 and 17, of the second alternative embodiment 52 for the present invention electrical control system that includes a higher voltage direct current supply system power input 155. Further, FIG. 31 shows a direct current to direct current converter regulator circuit 160, a controlled voltage direct current inverter circuit power feed 165, the inverter circuit assembly 140 with inverter switches 145 and freewheeling diodes 150, a lower pulse width modulation smoothed three phase alternating current 171 for a smoothed lower harmonic wave form 210, and the high speed permanent magnet motor 55 with a signal 101 generated from the auxiliary stator wire loop 106 (not shown) disposed within the stator wire windings 126 (not shown), and further with the addition of the auxiliary load circuit 167.

Broadly, in looking at FIGS. 2 through 21 and FIGS. 23 through 31, the present invention is an electrical control system 50, 51, 52, or 53 that includes a direct current to direct current converter regulator circuit 160 that receives a direct current supply system power input 155, wherein the regulator 160 outputs a controlled voltage direct current inverter circuit power feed 165. Further included in the electrical control system 50, 51, 52, or 53 is an inverter circuit assembly 140 that is in electrical communication with the regulator 160 and receives the controlled voltage direct current inverter power feed 165, wherein the inverter 140 outputs an alternating current waveform motor power feed 171 for a smoothed lower harmonic wave form 210. Also included in the electrical control system 50 or 51 is a permanent magnet brushless direct current motor 55 that is in electrical communication with the inverter 140 and receives the alternating current waveform motor power feed 171 for a smoothed lower harmonic wave form 210, wherein the motor 55 outputs a shaft rotational speed 95 and a back electromotive force 100. In addition, for the electrical control system 50 or 51 a means 225 is provided for regulating the controlled voltage direct current inverter circuit power feed 165 based upon criteria utilizing the motor shaft rotational speed 95 and the back electromotive force 100 to substantially make the controlled voltage 165 proportional 230 to the back electromotive force 100 to reduce a pulse width modulation switching frequency to further smooth the alternating current 171 waveform 210 to increase motor efficiency, regulator efficiency, and electro-magnetic compatibility for reduced filtering.

Thus, to make the controlled voltage 165 approximately proportionally 230 above the electromotive force 100 by the sum of the voltage drops 105 above the back electromotive force 100 being approximately equal to the sum of the voltage drops 105.

In referring in particular to FIG. 12 and FIGS. 2 through 5, it is desired to vary the voltage 155 of the controller 160 during the high-speed operation of the motor 55 based upon both motor 55 speed 95 and motor 55 load, without limiting available power during low-speed 95 operation of the motor 55, particularly during transient, low-speed acceleration into high-speed operation of the motor 55. The disclosed structure and method of control is embodied in the means 225, as shown in FIG. 9, being preferably as follows; to dynamically manage the voltage 165 to the motor 55 speed 95 and motor 55 load. The duty cycle of the regulator 160 will be used to modulate the voltage 165 presented to the inverter 140 in a manner consistent with that seen during the operation of a "buck" direct current to direct current converter 160, see FIGS. 2 and 4. The correct full-motor 55 load voltage 165 will be obtained through the action of the control loop feedback mechanism or proportional integral derivative control termed PID control loop whose input is the difference between actual motor 55 rotational speed 95 and the desired motor 55 rotational speed 95 setpoint, also known as a "speed error", and whose output is the pulse width modulation termed PWM demand to drive the regulator 160. Further included for the means 225 that preferably allows for full control or power to be available during transient acceleration of the motor 55, the duty cycle of the regulator 160 will be temporarily controlled to provide a full voltage 165 that is much greater than required by the motor 55 during low-rotational speed 95 operation. During this time the control loop feedback mechanism or proportional integral derivative control termed PID controller used to generate pulse with modulation PWM demand for the regulator 160 will have an input 155 which is the difference between the actual direct current voltage and the desired direct current voltage. Also during this time, the inverter 140 will be operated in a manner consistent with the normal BLDC motor 55 block commutation scheme. The motor 55 current will be controlled to the desired level through the action of the control loop feedback mechanism or proportional integral derivative control termed PID loop whose input is the previously mentioned speed error and whose output 165 is a required pulse width modulation PWM demand for use in the inverter 140. Due to the use of the elevated voltage during this time the current seen by the motor 55 will be greatly reduced.

To effectuate reduced losses in the BLDC motor 55 during the transient, high-voltage acceleration mode previously described, the motor 55 losses approach those seen in normal block commutation mode. Since this condition is defined as transient, the steady-state condition is of primary importance in determining operating limits of the motor 55. During steady-state operation, the motor 55 losses will be reduced due to the dynamic matching of voltage 165 to BLDC motor 55 speed 95 and motor 55 load, as that shown in FIG. 12. Thus, during steady-state operation, the amount of pulse width modulation PWM switching frequency present in the current waveforms will be desirably greatly reduced see contrast between FIGS. 13 and 14. Thus, the prior art filtering 215, as shown in FIG. 1, will be eliminated or limited with its attendant disadvantages as previously described.

Referencing the two embodiments of the electrical control system being 50 or 51, it can be seen that if the supply direct current voltage 155 does not proportionally match the motor 55 back electromotive force EMF 100, a direct current to direct current converter 160 can be used to "buck", FIG. 2, or "boost" FIG. 3, the supply direct current power 155 with the means 225 that preferably includes the control loop feedback mechanism or proportional integral derivative control termed PID control loop whose input is the difference between actual motor 55 rotational speed 95 and the desired motor 55 rotational speed 95 and with the control loop feedback mechanism or proportional integral derivative control termed PID controller also used to generate pulse with modulation PWM demand for the regulator 160 which will have an input 155 that is the difference between the actual direct current voltage 155 and the desired direct current voltage that creates a feedback structure and method that is utilized to minimize the magnet eddy current losses thus to reduce the electrical control system 50 or 51 inefficiency.

For the other alternate embodiments of the electrical control system 53 or 53, referring to FIGS. 15 through 21 and FIGS. 23 through 29, and FIG. 31, on the signal 101 generated from the auxiliary stator wire loop 106, has been disclosed which can be used to sense rotor 60 speed and position of a brush-less DC (BLDC) motor 55 and/or generator. The wire loop system 107 is comprised of several separate components including the wire loop 106, the signal 101, the circuitry 102, and the means 235, which must work together to produce the final solution being in the form of a processed signal for indicating rotor 60 speed 95 and rotor 60 position rotationally, i.e. rotor 60 magnets in rotational relation to stator phase windings 126. The first component of the system 107 is an auxiliary winding loop 106 which is added to the structure of the main stator windings 126, see FIGS. 19 and 20 in particular.

The signal 101 output of the speed loop 106 has two distinct signal components, the first is a sinusoidal waveform which is derived from moving magnetic field of the BLDC 55 stator 110 and is related to the angular velocity and position of the rotor 60, as this signal 101 contains the information for commutation control. The second component of the signal 101 is a large amplitude PWM noise signal which is due to the fact that the speed loop 106 is wound on the same magnetic structure as the main winding 126, resulting in colocation of the coils that creates transformer coupling between the two, being the wire loop 106 and the stator winding 126, which transfers electrical noise into the speed loop 106 signal 101.

Thus, extracting a usable signal from the noise or dirty signal 101 requires several stages of analog signal processing. The disclosed implementation of processing the dirty signal 101 is comprised of a low-pass filter followed by a zero crossing detector. Two important design points for the analog stage of signal 101 processing are that the cross-over frequency for the filter must be chosen to be above the fundamental electrical frequency of the BLDC 55 while remaining below the PWM frequency and that the switch point of the zero cross should be derived from the mid-point of the min/max values of the incoming waveform to the motor 55, with the output of the analog stage is a square wave having a nearly 50% duty cycle and who's frequency exactly matches that of the motor/generator 55. The time delay of the analog filter for the signal 101 produces a frequency dependent phase shift which acts to obscure the position information required for commutation control; this will be corrected using a digital technique in the Field Programmable Gate Array (FPGA).

The square wave output from the original signal 101 is passed into the FPGA as a digital signal and undergoes several stages of digital processing, first, the rising edges are passed into a Digital Phase Locked Loop (DPLL), wherein the period of the DPLL is used as a means to obtain a stable measurement of the input period at the native clock rate of the FPGA, with the DPLL acting to reject any jitter present on the incoming square wave while providing good tracking of input changes. The measured period originating from the signal 101 is used to generate an internal ramp which provides a reference keyed to the rotation 90 of the motor 55 rotor 60. As mentioned above, the analog filtering used to recover the signal 101 results in a fixed time delay between the original speed loop 106 signal 101 and the digital, square wave, zero crossing reference, wherein the measured time delay is used to run a fixed length timer of equal value and the number of ramp steps during this interval are counted. In this manner, the angular impact of the time delay from the signal 101 is directly measured at all rotor 60 speeds 95 and the final ramp is offset in time by the measured angular value to provide real time compensation for the delay.

Likewise, the speed loop 106 sense coil may have a fixed angular offset from the ideal zero degree position for motor 55 commutation, due to its placement in the stator 110 structure, with the fixed number corresponding to the angular offset of the motor 55 rotor 60 in relation to the stator 110 is also used to offset the internal reference ramp in time. Finally, since neither the fixed offset nor the time delay are known precisely, an optional means of adjusting the initial values during setup is provided to "tune" the operation of the final system 107.

Broadly, the electrical control system 50 and 51 as shown in FIGS. 2 through 12 and FIGS. 24 through 30, includes the direct current to direct current converter regulator circuit 160 that receives a direct current supply system power input 155, wherein the regulator 160 outputs a controlled voltage direct current inverter circuit power feed 165. Further included in the electrical control system 50 and 51 is the inverter circuit assembly 140 that is in electrical communication with the regulator 160 and receives the controlled voltage direct current inverter power feed 165, wherein the inverter 140 outputs an alternating current waveform motor power feed 171, 210, see FIGS. 2 through 5 in particular.

Also included in the electrical control system 50 and 51 is the permanent magnet brushless direct current motor 55, see in particular FIGS. 6 and 7, that is in electrical communication with the inverter 140 and receives the alternating current waveform motor power feed 171, 210, as shown in FIGS. 2 through 5. The motor 55 having a load 300, see FIGS. 24 and 25, wherein the motor 55 outputs a back electromotive force 100 that is proportional to a motor 55 shaft 65 rotational speed 95, see in particular FIG. 12, also FIGS. 2 through 6.

Further included in the electrical control system 50 and 51 is the means 225 for regulating the controlled voltage direct current inverter circuit 140 power feed 165 via the direct current to direct current converter regulator circuit 160, see FIG. 9 in particular. The means 225 is based upon criteria utilizing the back electromotive force 100 or the motor load 300 to substantially make the controlled voltage 165 proportional to the back electromotive force 100 or the motor load 300 to reduce a pulse width modulation switching frequency to further smooth the alternating current waveform with reduced harmonic content, essentially going from FIG. 14 to FIG. 13, this being to increase motor 55 efficiency, regulator efficiency, and electromagnetic compatibility for reduced filtering. See in particular test results in FIG. 29 showing reduced motor 55 temperatures 310, 315, 320, and 325, as depicted in FIG. 20, from the "voltage match" row in FIG. 29.

Continuing on the means 225 for the electrical control system 50 and 51, wherein the means 225 for regulating the controlled voltage 165 further comprises circuitry, see FIG. 9, to convert the back electromotive force 100 into a processed signal to determine an actual motor 55 rotor 65 speed 95 and a motor 55 rotor 65 rotational position relative to a motor stator 110, see FIGS. 6 and 7. Again referring back to FIG. 9, a motor rotor speed 95 differential error is determined from the actual motor rotor speed 95 and a motor rotor speed 95 determined from the inverter 140 alternating current frequency. Further a current differential error is determined from a difference as between an actual motor current and a demand current, wherein an instantaneous voltage loss drop 105, 230, see FIG. 12, is determined from the current differential and is added to the back electromotive force 100 related to the actual speed 95 to determine a voltage feed 165 via the direct current to direct current converter regulator 160 to the inverter 140 to better match motor rotor speed 95 or a motor load 300 from the actual current. See FIG. 29 for "voltage match" improved motor 55 performance.

Further, on the means 225 for the electrical control system 50 and 51, wherein the means 225 for regulating the controlled voltage 165 further comprises circuitry, see FIG. 9, to convert the back electromotive force 100 into a processed signal to determine an actual motor 55 rotor 65 speed 95 and a motor 55 rotor 65 rotational position relative to a motor stator 110, see FIGS. 6 and 7. Thus, the actual motor 55 rotor 65 speed 95 and the actual motor 55 current are both indexed into a database for the motor 55, wherein the database will determine a voltage feed 165 to the inverter 140 via the direct current to direct current converter regulator 160 to better match motor 55 rotor 65 speed 95 or the motor 55 load 300 from the actual current.

Alternatively, on the electrical control system 52 and 53, looking at FIGS. 15 through 21 and FIGS. 23 through 29, plus FIG. 31, includes the direct current to direct current converter regulator circuit 160 that receives a direct current supply system power input 155, wherein the regulator 160 outputs a controlled voltage direct current inverter circuit power feed 165. Further included in the electrical control system 52 and 53 is the inverter circuit assembly 140 that is in electrical communication with the regulator 160 and receives the controlled voltage direct current inverter power feed 165, wherein the inverter 140 outputs an alternating current waveform motor power feed 171, 210, see FIGS. 15 through 18 in particular.

Also, included on the electrical control system 52 and 53 is the permanent magnet brushless direct current motor 55 that is in electrical communication with the inverter 140 and receives the alternating current waveform motor power feed 171, 210, see FIGS. 15 through 18. In addition, for the electrical control system 52 and 53, the motor 55 also includes an auxiliary stator wire loop 106 embedded within a stator wiring 126 of the motor 55, see in particular FIGS. 19 and 20, wherein the auxiliary stator wire loop 106 outputs a signal 101 to mimic electrical activity in the stator wiring 126.

Further included in the electrical control system 52 and 53 is the means 235 for regulating the controlled voltage direct current inverter circuit 140 power feed 165 based upon criteria utilizing the signal 101 from said auxiliary stator wire loop 106, with voltage control 165 via the direct current to direct current converter regulator circuit 160, see FIG. 21 in particular. For the means 235, the purpose is to substantially make the controlled voltage 165 proportional to the motor 55 rotational speed 95 and a motor 55 rotor 65 relative rotational position, to the stator wiring 126, see FIGS. 19 and 20, to reduce a pulse width modulation switching frequency to further smooth the alternating current waveform with reduced harmonic content, essentially going from FIG. 14 to FIG. 13, this being to increase motor 55 efficiency, regulator efficiency, and electromagnetic compatibility for reduced filtering. See in particular test results in FIG. 29 showing reduced motor 55 temperatures 310, 315, 320, and 325, as depicted in FIG. 20, from the "voltage match" row in FIG. 29.

Further, on the wire loop 106 for the electrical control system 52 and 53, and in referring to FIGS. 19 and 20, the stator wire loop 106 is embedded in the stator 110 such that the wire loop 106 is juxtapose to a group of stator wire windings 126 encompassing a stator core 125. In addition, for the electrical control system 52 and 53 for the stator wire loop 106, it is preferably constructed of a continuous wire loop 106 that transverses at least one stator core 125, wherein the continuous wire loop 106 has a pair of terminations, again see FIGS. 19 and 20. Continuing, for the electrical control system 52 and 53 for the stator wire loop 106, the stator wire loop 106 terminations are in electrical communication with the means 235 for regulating the controlled voltage 165 that includes circuitry 102, see FIG. 23, to process the signal 101 from the stator wire loop 106 that includes a sinusoidal waveform from a moving magnetic field in the stator 110 and a pulse width modulation noise signal both via a transformer coupling as between the stator wire loop 106 and the stator wire windings 126.

Next, on the electrical control system 52 and 53, wherein the circuitry 102 includes a filter having a cross over frequency that is greater than a frequency of the motor 55 and the same cross over frequency being less than a frequency of the pulse width modulation noise signal. Further, the circuitry 102 includes a zero crossing detector with a switch point at a midpoint of minimum and maximum values of the sinusoidal waveform, resulting in the circuitry 102 outputting a square wave with a frequency that matches the motor 55.

Continuing, on the electrical control system 52 and 53, the means 235 for regulating the controlled voltage 165 further includes a field programmable gate array that intakes the square wave from circuit 102, wherein rising edges of the square wave are passed into a digital phase locked loop whose period is used to obtain an input period of the square wave at a clock rate of the field programmable gate array, wherein the input period is used to generate an internal ramp of the square wave that is keyed to rotation of the motor 55. The square wave has a time delay with an actual motor 55 sinusoidal waveform, wherein the time delay has a selected number of internal ramp steps that are accounted for at various motor rotational speeds to compensate for the time delay, wherein an instantaneous motor 55 rotor 65 speed 95 is determined from a frequency of the square wave and a motor 55 rotor 60 rotational position, see FIGS. 19 and 20 being determined from an angular offset of a position of the stator wire loop 106 in relation to a zero degree position for motor 55 commutation.

Method of Use

Looking at FIGS. 2 through 14, and FIGS. 24 through 30, a method of controlling the sensorless permanent magnet brushless direct current motor 55 is disclosed, comprising the steps of firstly providing the electrical control system 50 and 51 as previously described. Next, a step of providing an initial DC voltage 155 to the direct current to direct current converter regulator 160 to produce a controlled voltage direct current 165, see in particular FIGS. 2 through 5. Continuing a step of inverting 140 the controlled voltage direct current 165 into the alternating current 171, 210 and a following step of supplying the alternating current 171, 210 to the motor 55 to initiate motor 55 rotor 60 rotation 90. Next, a step of sensing the back electromotive force 100 in a signal from the motor 55, see FIGS. 2 through 6, and FIG. 12, and a subsequent step of converting the back electromotive force 100 signal into the motor 55 rotor 60 speed 95 and a motor 55 rotor 60 position, see FIGS. 6 and 7.

Further, for the method of use for the electrical control system 50 and 51 of modulating the control voltage 165 based upon a rotor 60 speed 95 difference between the rotor 60 speed 95 in the immediately prior step and a selected rotor 60 speed 95 or the rotor 60 position. Next, repeating the previous three steps until the selected rotor 60 speed 95 is achieved to reduce a pulse width modulation switching frequency to further smooth the alternating current waveform with reduced harmonic content to increase motor efficiency, regulator efficiency, and electromagnetic compatibility for reduced filtering, further shown in going from FIGS. 14 to 13, or in the comparison of wave forms between FIGS. 26, 27, and 28, also as indicated in FIG. 29 with reduced motor temperatures 310, 315, 320, and 325 for the "voltage match" row.

Next in looking at FIGS. 15 through 21 and FIGS. 23 through 29, and FIG. 31, the method of controlling a sensorless permanent magnet brushless direct current motor 55, is disclosed that comprising the steps of firstly providing the electrical control system 52 and 53 as previously described. Next, a step of providing an initial DC voltage 155 to the direct current to direct current converter regulator 160 to produce a controlled voltage direct current 165, see in particular FIGS. 2 through 5. Continuing a step of inverting 140 the controlled voltage direct current 165 into the alternating current 171, 210 and a following step of supplying the alternating current 171, 210 to the motor 55 to initiate motor 55 rotor 60 rotation 90. Continuing a step of sensing the signal 101 from the auxiliary stator wire loop 106 from the motor, as best shown in FIGS. 19 and 20, further, a step of converting the signal 101 from the auxiliary stator wire loop 106 into the motor 55 rotor 60 speed 95 and the motor 55 rotor 60 position, see FIGS. 19, 20, 21, and 23.

Further, for the method of use for the electrical control system 52 and 53 of modulating the control voltage 165 based upon a rotor 60 speed 95 difference between the rotor 60 speed 95 in the immediately prior step and a selected rotor 60 speed 95 or the rotor 60 position. Next, repeating the previous three steps until the selected rotor 60 speed 95 is achieved to reduce a pulse width modulation switching frequency to further smooth the alternating current waveform with reduced harmonic content to increase motor efficiency, regulator efficiency, and electromagnetic compatibility for reduced filtering, further shown in going from FIGS. 14 to 13, or in the comparison of wave forms between FIGS. 26, 27, and 28, also as indicated in FIG. 29 with reduced motor temperatures 310, 315, 320, and 325 for the "voltage match" row.

Conclusion

Accordingly, the present invention of an Electrical Control System has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:
1. An electrical control system, comprising:
(a) a direct current to direct current converter regulator circuit that receives a direct current supply system power input, wherein said regulator circuit outputs a controlled voltage direct current inverter circuit power feed;
(b) an inverter circuit assembly that is in electrical communication with said regulator circuit and receives said controlled voltage direct current inverter power feed, wherein said inverter circuit assembly outputs an alternating current waveform motor power feed;
(c) a permanent magnet brushless direct current motor that is in electrical communication with said inverter circuit assembly and receives said alternating current waveform motor power feed, said motor having a load, wherein said motor outputs a back electromotive force that is proportional to a motor shaft rotational speed; and
(d) control circuitry for regulating said controlled voltage direct current inverter circuit power feed based upon criteria utilizing said back electromotive force or said motor load to substantially make said controlled voltage proportional to said back electromotive force or said motor load, said control circuitry converts said back electromotive force into a processed signal to determine an actual motor rotor speed and a motor rotor rotational position relative to a motor stator, wherein a motor rotor speed differential error is determined from said actual motor rotor speed and a motor rotor speed determined from inverter alternating current frequency, further a current differential error is determined from a difference as between an actual motor current and a demand current, wherein an instantaneous voltage loss drop is determined from said current differential error and is added to said back electromotive force related to said actual speed to determine a voltage feed to said inverter circuit assembly via said direct current to direct current converter regulator circuit to better match motor rotor speed or a motor load from said actual motor current, this is to operationally reduce a pulse width modulation switching frequency to further smooth said alternating current waveform with reduced harmonic content to increase motor efficiency, regulator efficiency, and electromagnetic compatibility for reduced filtering.

2. An electrical control system, comprising:
(a) a direct current to direct current converter regulator circuit that receives a direct current supply system power input, wherein said regulator circuit outputs a controlled voltage direct current inverter circuit power feed;
(b) an inverter circuit assembly that is in electrical communication with said regulator circuit and receives said controlled voltage direct current inverter power feed, wherein said inverter circuit assembly outputs an alternating current waveform motor power feed;
(c) a permanent magnet brushless direct current motor that is in electrical communication with said inverter circuit assembly and receives said alternating current waveform motor power feed, said motor also includes an auxiliary stator wire loop embedded within a stator wiring of said motor, said stator wire loop is embedded in motor stator such that said wire loop is juxtapose to a group of stator wire windings encompassing a stator core, further said stator wire loop is constructed of a continuous wire loop that transverses at least one stator core, wherein said continuous wire loop has a pair of terminations, wherein operationally said auxiliary stator wire loop outputs a signal to mimic electrical activity in said stator wiring; and
(d) control circuitry for regulating said controlled voltage direct current inverter circuit power feed based upon criteria utilizing said signal from said auxiliary stator wire loop to substantially make said controlled voltage proportional to a motor rotor rotational speed and a motor rotor relative rotational position to said stator wiring, wherein said stator wire loop terminations are in electrical communication with said control circuitry for regulating said controlled voltage that further includes circuitry to process said signal from said stator wire loop that includes a sinusoidal waveform from a moving magnetic field in said stator and a pulse width modulation noise signal both via a transformer coupling as between said stator wire loop and said stator wire windings, said control circuitry also includes a filter having a cross over frequency that is greater than a frequency of said motor and said cross over frequency being less than a frequency of said pulse width modulation noise signal, further said control circuitry includes a zero crossing detector with a switch point at a midpoint of minimum and maximum values of said sinusoidal waveform, resulting in said control circuitry outputting a square wave with a frequency that matches said motor, wherein said control circuitry is operational to reduce a pulse width modulation switching frequency to further smooth said alternating current waveform with reduced harmonic content to increase motor efficiency, regulator efficiency, and electromagnetic compatibility for reduced filtering.

3. An electrical control system according to claim 2 wherein said control circuitry for regulating said controlled voltage further includes a field programmable gate array that intakes square wave wherein rising edges of said square wave are passed into a digital phase locked loop whose period is used to obtain an input period of said square wave at a clock rate of said field programmable gate array, said input period is used to generate an internal ramp of said square wave that is keyed to rotation of said motor, said square wave has a time delay with an actual motor sinusoidal waveform, wherein said time delay has a selected number of said internal ramp steps that are accounted for at various motor rotational speeds to compensate for said time delay, wherein an instantaneous motor rotor speed is determined from a frequency of said square wave and a motor rotor rotational position is determined from an angular offset of a position of said stator wire loop in relation to a zero degree position for motor commutation.

4. A method of controlling a sensorless permanent magnet brushless direct current motor, comprising the steps of:
(a) providing a direct current to direct current converter regulator circuit that receives a direct current supply system power input, wherein said regulator circuit outputs a controlled voltage direct current inverter circuit power feed, an inverter circuit assembly that is in electrical communication with said regulator circuit and receives said controlled voltage direct current inverter power feed, wherein said inverter circuit assembly outputs an alternating current waveform motor power feed, a permanent magnet brushless direct current motor that is in electrical communication with said inverter circuit assembly and receives said alternating current waveform motor power feed, said motor having a load, wherein said motor outputs a back electromotive force that is proportional to a motor shaft rotational speed, and control circuitry for regulating said controlled voltage direct current inverter circuit power feed based upon criteria utilizing said back electromotive force or said motor load to substantially make said controlled voltage proportional to said back electromotive force or said motor load, said control circuitry converts said back electromotive force into a processed signal to determine an actual motor rotor speed and a motor rotor rotational position relative to a motor stator, wherein a motor rotor speed differential error is determined from said actual motor rotor speed and a motor rotor speed determined from inverter alternating current frequency, further a current differential error is determined from a difference as between an actual motor current and a demand current, wherein an instantaneous voltage loss drop is determined from said current differential error and is added to said back electromotive force related to said actual speed to determine a voltage feed to said inverter circuit assembly via said direct current to direct current converter regulator to better match motor rotor speed or a motor load from said actual current, this is to operationally reduce a pulse width modulation switching frequency to further smooth said alternating current waveform with reduced harmonic content to increase motor efficiency, regulator efficiency, and electromagnetic compatibility for reduced filtering;
(b) providing an initial DC voltage to said direct current to direct current converter regulator circuit to produce a controlled voltage direct current;
(c) inverting said controlled voltage direct current into said alternating current;
(d) supplying said alternating current to said motor to initiate motor rotor rotation;
(e) sensing said back electromotive force in a signal from said motor;
(f) converting said back electromotive force via said processed signal into an actual motor rotor speed and a motor rotor position;
(g) modulating said controlled voltage output from said direct current to direct current converter regulator circuit based upon a rotor speed difference between said rotor speed in step (f) and a motor rotor speed determined from inverter alternating current frequency further a current differential error is determined from a difference as between an actual motor current and a demand current, wherein an instantaneous voltage loss drop is determined from said current differential error and is added to said back electromotive force related to said actual speed to determine a voltage feed to said inverter via said direct current to direct current converter regulator circuit to better match motor rotor speed or a motor load from said actual current, or said rotor position; and
(h) repeating said steps (e), (f), and (g) until said selected rotor speed is achieved to reduce a pulse width modulation switching frequency to further smooth said alternating current waveform with reduced harmonic content to increase motor efficiency, regulator efficiency, and electromagnetic compatibility for reduced filtering.

5. A method of controlling a sensorless permanent magnet brushless direct current motor, comprising the steps of:
(a) providing a direct current to direct current converter regulator circuit that receives a direct current supply system power input, wherein said regulator circuit outputs a controlled voltage direct current inverter circuit power feed, an inverter circuit assembly that is in electrical communication with said regulator circuit and receives said controlled voltage direct current inverter power feed, wherein said inverter circuit assembly outputs an alternating current waveform motor power feed, a permanent magnet brushless direct current motor that is in electrical communication with said inverter circuit assembly and receives said alternating current waveform motor power feed, said motor also includes an auxiliary stator wire loop embedded within a stator wiring of said motor, said stator wire loop is embedded in said stator winding such that said wire loop is juxtapose to a group of stator wire windings encompassing a stator core, further said stator wire loop is constructed of a continuous wire loop that transverses at least one stator core, wherein said continuous wire loop has a pair of terminations, wherein operationally said auxiliary stator wire loop outputs a signal to mimic electrical activity in said stator wiring, and a-means control circuitry for regulating said controlled voltage direct current inverter circuit power feed based upon criteria utilizing said signal from said auxiliary stator wire loop to substantially make said controlled voltage proportional to a motor rotor rotational speed and a motor rotor relative rotational position to said stator wiring, wherein said stator wire loop terminations are in electrical communication with said control circuitry for regulating said controlled voltage that further includes circuitry to process said signal from said stator wire loop that includes a sinusoidal waveform from a moving magnetic field in said stator and a pulse width modulation noise signal both via a transformer coupling as between said stator wire loop and said stator wire windings, said control circuitry also includes a filter having a cross over frequency that is greater than a frequency of said motor and said cross over frequency being less than a frequency of said pulse width modulation noise signal, further said control circuitry includes a zero crossing detector with a switch point at a midpoint of minimum and maximum values of said sinusoidal waveform, resulting in said control circuitry outputting a square wave with a frequency that matches said motor, wherein said control circuitry is operational to reduce a pulse width modulation switching frequency to further smooth said alternating current waveform with reduced harmonic content to increase motor efficiency, regulator efficiency, and electromagnetic compatibility for reduced filtering;

(b) providing an initial DC voltage to said direct current to direct current converter regulator circuit;

(c) inverting said controlled voltage direct current into said alternating current;

(d) supplying said alternating current to said motor to initiate motor rotor rotation;

(e) sensing said signal from said auxiliary stator wire loop from said motor;

(f) converting said signal from said auxiliary stator wire loop into a motor rotor speed and a motor rotor position;

(g) modulating said controlled voltage output from said direct current to direct current converter regulator based upon a rotor speed difference between said rotor speed in step (f) and a selected rotor speed or said rotor position; and (h) repeating said steps (e), (f), and (g) until selected rotor speed is achieved to reduce a pulse width modulation switching frequency to further smooth said alternating current waveform with reduced harmonic content to increase motor efficiency, regulator efficiency, and electromagnetic compatibility for reduced filtering.

6. An electrical control system, comprising:

(a) a direct current to direct current converter regulator circuit that receives a direct current supply system power input, wherein said regulator circuit outputs a controlled voltage direct current inverter circuit power feed;

(b) an inverter circuit assembly that is in electrical communication with said regulator circuit and receives said controlled voltage direct current inverter power feed, wherein said inverter circuit assembly outputs an alternating current waveform motor power feed;

(c) a permanent magnet brushless direct current motor that is in electrical communication with said inverter circuit assembly and receives said alternating current waveform motor power feed, said motor having a load, wherein said motor outputs a back electromotive force that is proportional to a motor shaft rotational speed; and (d) control circuitry for regulating said controlled voltage direct current inverter circuit power feed based upon criteria utilizing said back electromotive force or said motor load to substantially make said controlled voltage proportional to said back electromotive force or said motor load, said control circuitry converts said back electromotive force into a processed signal to determine an actual motor rotor speed and a motor rotor rotational position relative to a motor stator, wherein said actual motor rotor speed and an actual motor current are both indexed into a database for said motor, wherein said database will determine a voltage feed to said inverter circuit assembly via said direct current to direct current converter regulator circuit to better match motor rotor speed or a motor load from said actual current to operationally reduce a pulse width modulation switching frequency to further smooth said alternating current waveform with reduced harmonic content to increase motor efficiency, regulator efficiency, and electromagnetic compatibility for reduced filtering.

* * * * *